(12) United States Patent
Williams et al.

(10) Patent No.: US 10,423,320 B2
(45) Date of Patent: Sep. 24, 2019

(54) GRAPHICAL USER INTERFACE FOR NAVIGATING A VIDEO

(71) Applicant: Philo, Inc., San Francisco, CA (US)

(72) Inventors: Devon Ray Williams, Berkeley, CA (US); Gabriel Edward Kangas, San Francisco, CA (US); Andrew McCollum, San Francisco, CA (US); Ginger Wong, Santa Clara, CA (US); Benjamin Avery Chambers, San Francisco, CA (US)

(73) Assignee: PHILO, INC., San Francisco, CA (US)

( * ) Notice: Subject to any disclaimer, the term of this patent is extended or adjusted under 35 U.S.C. 154(b) by 0 days.

(21) Appl. No.: 15/811,668

(22) Filed: Nov. 13, 2017

(65) Prior Publication Data

US 2019/0146651 A1     May 16, 2019

(51) Int. Cl.
| | |
|---|---|
| *G06F 3/00* | (2006.01) |
| *G06F 3/0485* | (2013.01) |
| *G11B 27/34* | (2006.01) |
| *G06F 3/0482* | (2013.01) |
| *G06F 3/0488* | (2013.01) |
| *G06F 3/01* | (2006.01) |

(52) U.S. Cl.
CPC .......... *G06F 3/0485* (2013.01); *G06F 3/0482* (2013.01); *G06F 3/04883* (2013.01); *G11B 27/34* (2013.01)

(58) Field of Classification Search
CPC ... G06F 3/0485; G06F 3/0482; G06F 3/04883
See application file for complete search history.

(56) References Cited

U.S. PATENT DOCUMENTS

| | | | |
|---|---|---|---|
| 5,884,056 A * | 3/1999 | Steele | H04N 7/17318 715/738 |
| 6,400,378 B1 * | 6/2002 | Snook | G11B 27/034 707/999.102 |
| 8,365,235 B2 | 1/2013 | Hunt et al. | |

(Continued)

OTHER PUBLICATIONS

Non-Final Office Action from U.S. Appl. No. 15/811,669, dated Apr. 9, 2018, 22 pages.

(Continued)

*Primary Examiner* — Nicholas Augustine
(74) *Attorney, Agent, or Firm* — Nicholson de Vos Webster & Elliott LLP

(57) ABSTRACT

A method performed by an electronic device to allow a user to navigate a video. The method includes causing a display of a currently selected thumbnail in a first rectangular area overlaying a bidirectionally scrollable strip of thumbnails in a second rectangular area having the plurality of thumbnails logically arranged in order according to their associated time positions and responsive to data reflecting a swipe gesture in a direction, causing an update to the display of the bidirectionally scrollable strip of thumbnails to reflect inertial scrolling in the direction, where the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area.

20 Claims, 14 Drawing Sheets

(56) References Cited

U.S. PATENT DOCUMENTS

| | | | |
|---|---|---|---|
| 9,740,293 B2* | 8/2017 | Kramer | G06F 3/0325 |
| 2006/0120624 A1* | 6/2006 | Jojic | G06F 16/745 |
| | | | 382/284 |
| 2007/0071413 A1* | 3/2007 | Takahashi | G11B 27/005 |
| | | | 386/230 |
| 2008/0263448 A1 | 10/2008 | Oppenheimer et al. | |
| 2008/0288869 A1* | 11/2008 | Ubillos | H04N 1/00453 |
| | | | 715/716 |
| 2009/0172543 A1 | 7/2009 | Cronin et al. | |
| 2009/0252431 A1 | 10/2009 | Lu et al. | |
| 2010/0174993 A1* | 7/2010 | Pennington | G06F 1/1616 |
| | | | 715/738 |
| 2011/0161818 A1 | 6/2011 | Viljamaa | |
| 2011/0205171 A1* | 8/2011 | Akiyoshi | G06F 3/04883 |
| | | | 345/173 |
| 2012/0166950 A1 | 6/2012 | Frumar et al. | |
| 2014/0123160 A1 | 5/2014 | Van Coppenolle et al. | |
| 2014/0325358 A1* | 10/2014 | Yun | G06F 3/0481 |
| | | | 715/720 |
| 2015/0177933 A1 | 6/2015 | Cueto | |
| 2016/0269455 A1 | 9/2016 | Casey et al. | |
| 2017/0068511 A1* | 3/2017 | Brown | G06F 3/167 |
| 2017/0150190 A1 | 5/2017 | Tarbox et al. | |
| 2017/0366644 A1 | 12/2017 | Grue et al. | |

OTHER PUBLICATIONS

Final Office Action from U.S. Appl. No. 15/811,669, dated Nov. 13, 2018, 26 pages.

* cited by examiner

Cause a display of the currently selected thumbnail in a first rectangular area overlaying a bidirectionally scrollable strip of thumbnails in a second rectangular area having the plurality of thumbnails logically arranged in order from left to right according to their associated time positions (510)

Responsive to data reflecting a swipe gesture in a direction from a user, cause an update to the display of the bidirectionally scrollable strip of thumbnails to reflect inertial scrolling in the direction, where the direction is left or right, where the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area and a preceding or following one of the thumbnails in the bidirectionally scrollable strip of thumbnails is selected as the currently selected thumbnail because it is now the closest to the center of the first rectangular area (520)

Fig. 5

GRAPHICAL USER INTERFACE FOR NAVIGATING A VIDEO

CROSS-REFERENCE TO RELATED APPLICATIONS

Cross-reference is made to co-pending U.S. application Ser. No. 15/811,669, entitled "THUMBNAIL PREVIEW AFTER A SEEK REQUEST WITHIN A VIDEO", filed on the same date as the present application and commonly owned. The cross-referenced application is incorporated herein by reference.

TECHNICAL FIELD

Embodiments of the invention relate to the field of media player applications, and more specifically, to a Graphical User Interface (GUI) that allows a user to navigate a video.

BACKGROUND

Streaming video over data networks (e.g., the Internet) has become increasingly popular as the availability of high-bandwidth Internet connections has increased. Video streaming refers to a type of video delivery mechanism where the data for the video is continuously delivered to a client electronic device over a data network (e.g., the Internet) as the user is viewing the video. Video streaming allows a user to start viewing portions of the video without having to first download the entire video. In fact, it is common to implement video streaming such that the client electronic device only buffers a threshold amount of the video following (and usually preceding) the user's current viewing position in the video.

Most media player applications provide a graphical user interface (GUI) that allows a user to navigate to a desired time position in the video (sometimes referred to as seeking or a seek operation). The GUI may facilitate navigation by allowing a user to see a preview of the video at various time positions in the video in the form of thumbnails. A thumbnail is typically a reduced-sized version of a video frame at a particular time position in the video (in other words, a version that requires less storage space for a variety of possible reasons—such as greater compression and reduced resolution relative to the video). Thumbnails help the user identify the part of the video that the user is interested in watching. For example, during playback of a video a user may use an input mechanism to see thumbnails corresponding to different time positions in the video (e.g., the user uses a mouse to cause the cursor to hover over different points on the horizontal navigation bar to see thumbnails associated with different time positions in the video). This helps the user identify the content at various time positions in the video. The user may then select one of the thumbnails (or the point in the navigation bar corresponding to the thumbnail) to seek (jump) to the time position associated with the thumbnail. In this way, the user may use the navigation bar to navigate to the desired time position in the video. The thumbnails can be thought of as serving as an index into the video.

With traditional video navigation GUIs such as the one described above, the size of the display area used to display a thumbnail is typically relatively small as compared to the entire display area, making it difficult to see the details of the thumbnail. Also, since the size of the horizontal navigation bar is limited by the width of the display screen (or part thereof being used to display the video), the ability of the user to use the input mechanism to select a desired time position in the video from which playback should begin may be awkward, difficult, or not possible (in other words, the user's desired level of granularity in selecting a starting time position for playback may be finer than the level of granularity actually provided). For example, the time increments in the video corresponding to each thumbnail may be relatively long as compared to the user's desired level of precision when selecting a time position in the video from which playback is to begin, especially for videos that are relatively long in duration. For instance, the shortest time increment between thumbnails displayed over the navigation bar might be as long as 15-20 seconds. Independent of or in addition to relatively long time increments, a limitation on the width of the display area within which the horizontal navigation bar is being displayed may (and often does on mobile devices) result in the distance between user selectable points on the horizontal navigation bar corresponding to selectable time positions within the video being too small for the user to use the user controlled selection mechanism to select a desired position in the video (e.g., inputting the desired time position within the video by moving the cursor back and forth over the navigation bar can be awkward and difficult). For instance, the width of the touch screen on a mobile device may force the display area for displaying the horizontal navigation bar to be of a size that makes the distance between user selectable points being too close for a finger on a touch screen user input mechanism to work well (e.g., even if the user can position their finger such that the desired time position is selected, the action of the user lifting their finger to indicate playback should start from that time position can result in selection of a different time position in the video).

Independently, when the user makes a request to seek to a different time position in the video, there may be a noticeable delay between the request and when the video starts playing due to various network and processing delays. During this time, the user is typically presented with a freeze frame of the former playback position (e.g., the frame that the user was at in the video before making the seek request) or a blank screen.

SUMMARY

A method performed by an electronic device to allow a user to navigate a video, where there are a plurality of thumbnails of the video, where each of the thumbnails is associated with a time position in the video, and where there is a currently selected thumbnail of the plurality of thumbnails. The method includes causing a display of the currently selected thumbnail in a first rectangular area overlaying a bidirectionally scrollable strip of thumbnails in a second rectangular area having the plurality of thumbnails logically arranged in order from left to right according to their associated time positions, where the currently selected thumbnail in the first rectangular area is the one of the plurality of thumbnails in the bidirectionally scrollable strip of thumbnails that is closest to a center of the first rectangular area, and where at least part of the currently selected thumbnail in the first rectangular area overlays the currently selected thumbnail in the bidirectionally scrollable strip of thumbnails. The method further includes causing, responsive to data reflecting a swipe gesture in a direction from a user, an update to the display of the bidirectionally scrollable strip of thumbnails to reflect inertial scrolling in the direction, where the direction is left or right, and where the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area and a preceding or following one of the thumbnails in the bidirectionally scrollable strip of thumbnails is selected as the currently selected thumbnail because it is now closest to the center of the first rectangular area.

A device for allowing a user to navigate a video, where there are a plurality of thumbnails of the video, where each of the thumbnails is associated with a time position in the video, and where there is a currently selected thumbnail of the plurality of thumbnails. The device includes one or more processors, a network interface to interface with a data network, a video interface to output the video to a display, and an input/output (I/O) interface to receive user input, and a non-transitory computer-readable medium. The non-transitory computer-readable medium has stored therein instructions, which when executed by the one or more processors, causes the device to cause a display of the currently selected thumbnail in a first rectangular area overlaying a bidirectionally scrollable strip of thumbnails in a second rectangular area having the plurality of thumbnails logically arranged in order from left to right according to their associated time positions, where the currently selected thumbnail in the first rectangular area is the one of the plurality of thumbnails in the bidirectionally scrollable strip of thumbnails that is closest to a center of the first rectangular area, and where at least part of the currently selected thumbnail in the first rectangular area overlays the currently selected thumbnail in the bidirectionally scrollable strip of thumbnails. The instructions, when executed by the one or more processors, further causes the device to cause, responsive to data reflecting a swipe gesture in a direction from a user, an update to the display of the bidirectionally scrollable strip of thumbnails to reflect inertial scrolling in the direction, where the direction is left or right, and where the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area and a preceding or following one of the thumbnails in the bidirectionally scrollable strip of thumbnails is selected as the currently selected thumbnail because it is now closest to the center of the first rectangular area.

A non-transitory computer-readable medium having stored therein instructions, which when executed by one or more processors of an electronic device, causes the electronic device to perform operations for allowing a user to navigate a video, where there are a plurality of thumbnails of the video, where each of the thumbnails is associated with a time position in the video, where there is a currently selected thumbnail of the plurality of thumbnails. The operations include causing a display of the currently selected thumbnail in a first rectangular area overlaying a bidirectionally scrollable strip of thumbnails in a second rectangular area having the plurality of thumbnails logically arranged in order from left to right according to their associated time positions, where the currently selected thumbnail in the first rectangular area is the one of the plurality of thumbnails in the bidirectionally scrollable strip of thumbnails that is closest to a center of the first rectangular area, and where at least part of the currently selected thumbnail in the first rectangular area overlays the currently selected thumbnail in the bidirectionally scrollable strip of thumbnails. The operations further include causing, responsive to data reflecting a swipe gesture in a direction from a user, an update to the display of the bidirectionally scrollable strip of thumbnails to reflect inertial scrolling in the direction, where the direction is left or right, and where the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area and a preceding or following one of the thumbnails in the bidirectionally scrollable strip of thumbnails is selected as the currently selected thumbnail because it is now closest to the center of the first rectangular area.

BRIEF DESCRIPTION OF THE DRAWINGS

The invention may best be understood by referring to the following description and accompanying drawings that are used to illustrate embodiments of the invention. In the drawings:

FIG. 5 is a flow diagram of a process for allowing a user to navigate a video, according to some embodiments.

DETAILED DESCRIPTION

Figure 1:
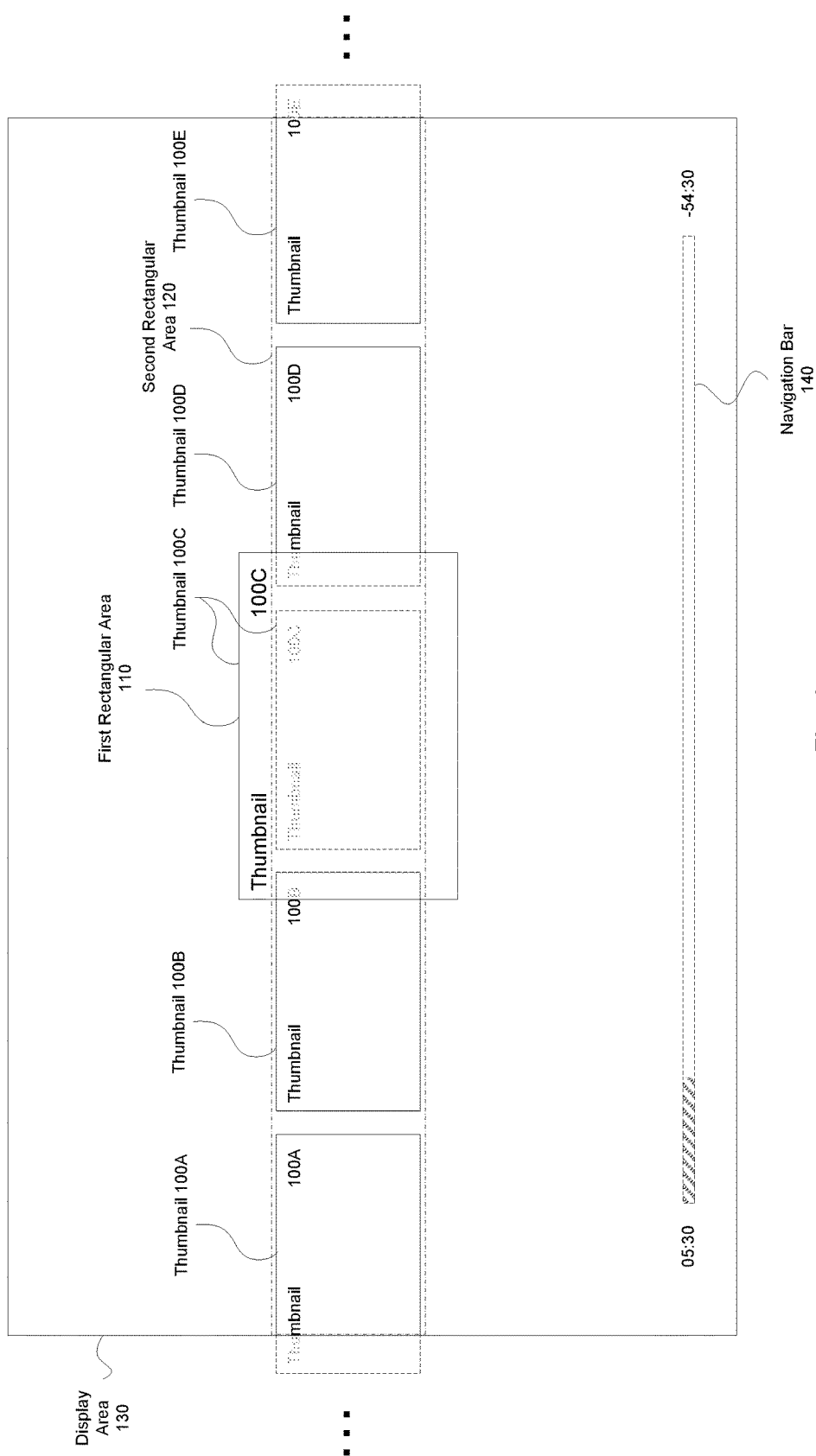
FIG. 1 is a diagram illustrating a GUI that allows a user to navigate a video, according to some embodiments.

The following description describes systems, methods, and apparatus for generating and causing display of an enhanced Graphical User Interface (GUI) that allows a user to navigate a video. According to one aspect, the enhanced GUI enables navigating a video with a strip of thumbnails, overlaid with a currently selected one of the thumbnails, through which a user can scroll to locate the desired time position in a video. This approach may be particularly advantageous for a client electronic device with a touchscreen interface (also referred to as a touchscreen device), where the user can inertially scroll through the strip of thumbnails using swipe gestures. Additionally or alternatively, this approach may be particularly advantageous for a mobile client electronic device (also referred to as a mobile device, including a mobile device that is also a touchscreen device) with a relatively small screen. According to another aspect (which may be used in conjunction with or independently from the strip of thumbnails), the enhanced GUI provides a manner of transitioning, from a seek request within a video to playing the video, that appears to the user to reduce the delay between the selection of one of the thumbnails and when the video starts playing from the time position associated with that selected thumbnail. More particularly, when a user makes a request to seek to a particular time position in the video that is associated with a thumbnail, an expanded version of the thumbnail is displayed (e.g., to fill the entire display area being used for playback of the video) while the video is being buffered. This gives the user the perception that the video is loaded almost instantaneously even though the video is still being buffered. When the video has finished buffering (e.g., a sufficient amount of the video has been buffered to start playback), the video is played starting at the time position associated with the thumbnail to provide a seamless transition from the expanded version of the thumbnail to playback of the video. Other embodiments are further described herein.

As used herein, the terms "seek" or "seek operation," when referred to in a video navigation/playback context, refer to moving or jumping to a particular time position in a video (e.g., to begin playback of the video at that particular time position) separate from the normal playback progression of the video. As used herein, the term "seek request" refers to a request to seek to a particular time position in a video.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (or computing device) stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

As reflected earlier, an electronic device can take a variety of forms, including a client electronic device (also referred to as a client computing device) that implements a media player application that plays back video streamed over a network. Such a client electronic device may be used by a user and have one or more user input mechanisms, such as a keyboard, touchscreen, remote control, etc. Such client electronic devices may come in a variety of sizes, including relatively large (e.g., a smart TV, a set top box without a screen and intended to be connected to a display (such as a TV), or a desktop computer connected to a display) and relatively small (e.g., a mobile device such as a laptop, smart phone, or smart watch with an integrated (optionally touchscreen) display).

FIG. 1 is a diagram illustrating a GUI that allows a user to navigate a video, according to some embodiments. As shown in the diagram, the GUI is displayed in a display area 130 of a display screen. As used herein, a display area 130 is a portion of a display screen that is allocated to a given application for playing video and/or displaying GUI elements. The display area 130 may occupy the entire display screen (full-screen mode) or just occupy a portion of the display screen (e.g., an application window assigned to the application by the Operating System (OS) or a portion of the application window). The GUI includes a first rectangular area 110 and a second rectangular area 120. The first rectangular area 110 is used for displaying a currently selected thumbnail. The second rectangular area 120 is used for displaying a bidirectionally scrollable strip of thumbnails for a video (the second rectangular area 120 is represented in the diagram in dash-dotted lines). The strip of thumbnails includes a plurality of thumbnails 100, where each of the thumbnails 100 is associated with a time position in the video. The thumbnails 100 in the strip of thumbnails are logically arranged in chronological order according to their associated time positions in the video. As shown in the diagram, the strip of thumbnails includes thumbnail 100A, thumbnail 100B, thumbnail 100C, thumbnail 100D, and thumbnail 100E that are displayed (at least partially) in the display area 130. The strip of thumbnails may include additional thumbnails that logically extend to the left of thumbnail 100A and additional thumbnails that logically extend to the right of thumbnail 100E. These thumbnails 100 are not displayed in the display area 130 until the strip of thumbnails is scrolled to where those thumbnails 100 are located. In one embodiment, the GUI is activated when the user makes a request to enter video navigation mode while the video is being played. In an embodiment where the video is displayed on a touchscreen display, the user may activate the GUI by performing a swipe gesture on the display. Other mechanisms for activating the GUI are possible (e.g., holding down left or right arrow key on a keyboard or pressing fast-forward or rewind button on a remote control). In one embodiment, when the user makes a request to enter video navigation mode (e.g., to find a desired time position in the video and to make a seek request to that time position) while the video is being played (e.g., in the display area 130), the video is paused and the GUI is overlaid on top of the frame at which the video was paused (a freeze frame of the former playback position (e.g., the frame that the user was at in the video before making the seek request). In one embodiment, the frame at which the video was paused is muted (e.g., darkened or greyed out) to make the GUI elements stand out.

The first rectangular area 110 displays one of the thumbnails in the strip of thumbnails as being the currently selected thumbnail. The thumbnail in the first rectangular area 110 (partially) overlays the strip of thumbnails in the second rectangular area 120. In one embodiment, the thumbnail in the first rectangular area 110 and the strip of thumbnails in the second rectangular area 120 (partially) overlays a frame of a paused video. Thus, in one embodiment, the thumbnail in the first rectangular area 110 overlays the strip of thumbnails in the second rectangular area 120, which in turn overlays a frame of a paused video. In one embodiment, the currently selected thumbnail (that is displayed in the first rectangular area 110) is the thumbnail 100 in the strip of thumbnails that is closest to the center of the first rectangular area 110 (it should be understood, however, that other criteria can be used to determine which thumbnail 100 in the strip of thumbnails is the currently selected thumbnail). In this example, the currently selected thumbnail is thumbnail 100C, and thus the first rectangular area displays thumbnail 100C. In one embodiment, the currently selected thumbnail in the first rectangular area 110 (thumbnail 100C in this example) is larger than the thumbnails 100 in the strip of thumbnails. Additionally or alternatively, in one embodiment, the currently selected thumbnail in the first rectangular area 110 is displayed brighter than the thumbnails 100 in the strip of thumbnails. It should be noted that thumbnail 100A and thumbnail 100E are only partially displayed in the display area 130 since they exceed the bounds of the display area 130. The portions of thumbnails 100 that are outside the bounds of the display area 130 are represented in dashed lines. Also, since the currently selected thumbnail in the first rectangular area 110 overlays the strip of thumbnails in the second rectangular area 120, thumbnail 100C in the strip of thumbnails is completely hidden behind the currently selected thumbnail in the first rectangular area 110, and thumbnail 100B and thumbnail 100D in the strip of thumbnails are partially hidden behind the currently selected thumbnail in the first rectangular area 110. The portions of the thumbnails 100 that are hidden behind the currently selected thumbnail in the first rectangular area 110 are represented in dashed lines. Also, in FIG. 1 (as well as FIGS. 2-4) each thumbnail 100 is illustrated with a rectangle and is labeled with "Thumbnail" and its reference numeral both: 1) above that rectangle; and 2) inside that rectangle. With regard to the labeling inside the rectangles illustrating the thumbnails 100, the word "Thumbnail" is in the upper left corner and the reference numeral is in the upper right corner. Further, each letter/number of this labeling is: 1) black when that part of the thumbnail 100 would be visible (which is always true for the thumbnail in the first rectangular area 110); and 2) grey when covered (e.g., with regard to thumbnail 100B in the strip, "Thumbnail 100" is black and "B" is grey; with regard to thumbnail 100C, "Thumbnail 100C" is black in the version in the first rectangular area 110 and grey in the version in the strip of thumbnails (in the second rectangular area 120); with regard to thumbnail 100D in the strip of thumbnails, "Thu" is grey and "mbnail 100D" is black). While this labeling does not reflect actual content expected to be in the thumbnails, it does reflect what would and would not be visible if this labeling was the content of the thumbnails 100.

In one embodiment, a user can use an input mechanism to scroll through the strip of thumbnails. For example, in an embodiment where the GUI is displayed on a touchscreen display, the user may perform a swipe gesture on the display from right to left to inertially scroll the strip of thumbnails towards the left. Inertial scrolling refers to a type of scrolling where the scrolling motion of an object (e.g., the strip of thumbnails) continues in a decaying fashion after release of the touch, which simulates the appearance of an object with inertia. Similarly, the user may perform a swipe gesture on the display from left to right to inertially scroll the strip of thumbnails towards the right. Other mechanisms for scrolling through the strip of thumbnails are possible (e.g., inertially via swipe gestures on a touchpad; a single speed (or multiple speeds selected by multiple presses or duration of presses) via pressing left or right arrow keys on a keyboard or pressing fast-forward or rewind buttons on a remote control). Scrolling the strip of thumbnails to the left may cause thumbnail 100A to gradually transition out of the display area 130 and cause the portion of thumbnail 100E that is outside of the display area 130 to gradually transition into the display area 130. Also, as the strip of thumbnails is further scrolled to the left, thumbnails 100 may gradually transition out of the left side of the display area 130 and into the right side of the display area 130. Scrolling the strip of thumbnails to the right may cause thumbnail 100E to gradually transition out of the display area 130 and cause the portion of thumbnail 100A that is outside of the display area 130 to gradually transition into the display area 130. Also, as the strip of thumbnails is further scrolled to the right, thumbnails 100 may gradually transition into the left side of the display area 130 and out of the right side of the display area 130. Thus, the strip of thumbnails is bidirectionally scrollable (e.g., to the left and to the right), with thumbnails that logically extend beyond the bounds of the display area 130 (e.g., to the left and/or to the right of the display area 130) except when one is at the beginning of the video (in which case the first thumbnail 100 is shown in the first rectangular area 110 with no thumbnails 100 in the strip of thumbnails to the left of it) or end of the video (the last thumbnail 100 is shown in the first rectangular area 110 with no thumbnails in the strip of thumbnails to the right of it). The thumbnails 100 that extend beyond the bounds of the display area 130 can be brought into the display area by scrolling through the strip of thumbnails.

In one embodiment, the GUI also includes a navigation bar 140 that represents the video as a timeline. In one embodiment, the navigation bar 140 conveys the time position associated with the currently selected thumbnail in terms of the elapsed time from the beginning of the video and the time remaining in the video. In this example, the currently selected thumbnail (thumbnail 100C) is associated with a time position that is 5 minutes and 30 seconds into the video (5:30) with 54 minutes and 30 seconds remaining in the video (−54:30). While in one embodiment this information is displayed, alternative embodiments may operate differently (e.g., not display this information, display this information in a different way, display more or less information, or display different information).

In one embodiment, the currently selected thumbnail in the first rectangular area 110 is updated when the strip of thumbnails sufficiently scrolls past a threshold such that the currently selected thumbnail in the strip of thumbnails is no longer closest to the center of the first rectangular area 110. For example, a preceding or following one of the thumbnails 100 in the strip of thumbnails may be selected as the currently selected thumbnail (and displayed in the first rectangular area 110) when it is the closest to the center of the first rectangular area 110. This is illustrated in more detail in FIGS. 2-4.

Figure 2:
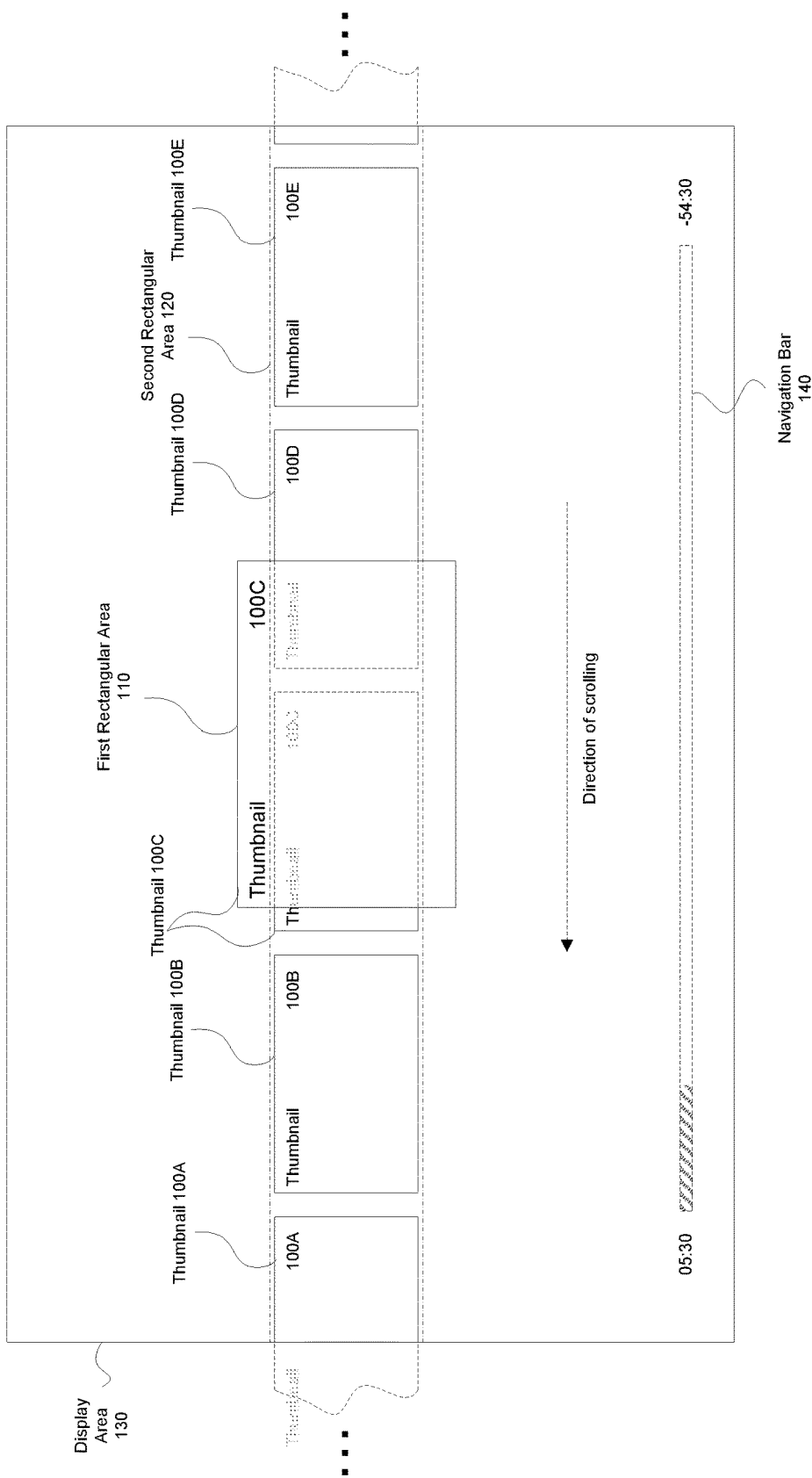
FIG. 2 is a diagram illustrating the GUI after the strip of thumbnails has been scrolled to the left, according to some embodiments.

FIG. 2 is a diagram illustrating the GUI after the strip of thumbnails has been scrolled to the left, according to some embodiments. As shown in the diagram, the strip of thumbnails has scrolled to the left (e.g., in response to a user performing a swipe gesture from right to left) such that: 1) thumbnail 100C in the strip of thumbnails is no longer completely hidden behind the currently selected thumbnail in the first rectangular area 110 and 2) a larger portion of thumbnail 100D is hidden behind the currently selected thumbnail in the first rectangular area 110. In this example, thumbnail 100C is still the closest to the center of the first rectangular area, and thus is still the currently selected thumbnail that is displayed in the first rectangular area 110. It should be noted that the thumbnail 100C displayed in the first rectangular area 110 is the same thumbnail as the thumbnail 100C that is displayed in the strip of thumbnails in the second rectangular area 120, except that the thumbnail 100C displayed in the first rectangular area 110 may be larger (e.g., it is sized to fill the first rectangular area 110) or otherwise highlighted to indicate that thumbnail 100C is the currently selected thumbnail. With regard to the labeling inside the rectangles illustrating the thumbnails 100, the following is shown: 1) with regard to thumbnail 100B in the strip, "Thumbnail 100B" is black; 2) with regard to thumbnail 100C, "Thumbnail 100C" is black in the version in the first rectangular area 110, while the version is the strip of thumbnails has "Th" in black and "umbnail 100C" in grey; and 3) with regard to thumbnail 100D in the strip, "Thumbnail" is grey and "100D" is black. Thus, with regard to this labeling, the currently selected thumbnail is displayed: 1) in its entirety in the first rectangular area 110; 2) not at all in the second rectangular area 120 when the strip is scrolled such that all of the version of the currently selected thumbnail in the strip of thumbnails is covered by the thumbnail in the first rectangular area 110 (FIG. 1); and 3) partially in the second rectangular area 120 (in the strip of thumbnails) when the strip of thumbnails is scrolled such that part of the version of the currently selected thumbnail in the strip of thumbnails is not covered by the thumbnail in the first rectangular area 110 (as in FIG. 2). This partial duplication contrasts with showing the currently selected thumbnail in the first rectangular area 110 without ever showing part of that same thumbnail in the second rectangular area 120 (where the term "same thumbnail" refers to a single thumbnail in the strip of thumbnails, and does not refer to a situation where two different thumbnails in the strip of thumbnails have identical content, with one being the currently selected thumbnail displayed in the first rectangular area 110 and the other being displayed in the second rectangular area 120). Also, a new thumbnail 100 to the right of thumbnail 100E has started to transition into the display area 130. Other thumbnails 100 in the strip of thumbnails have been scrolled to the left correspondingly.

Figure 3:
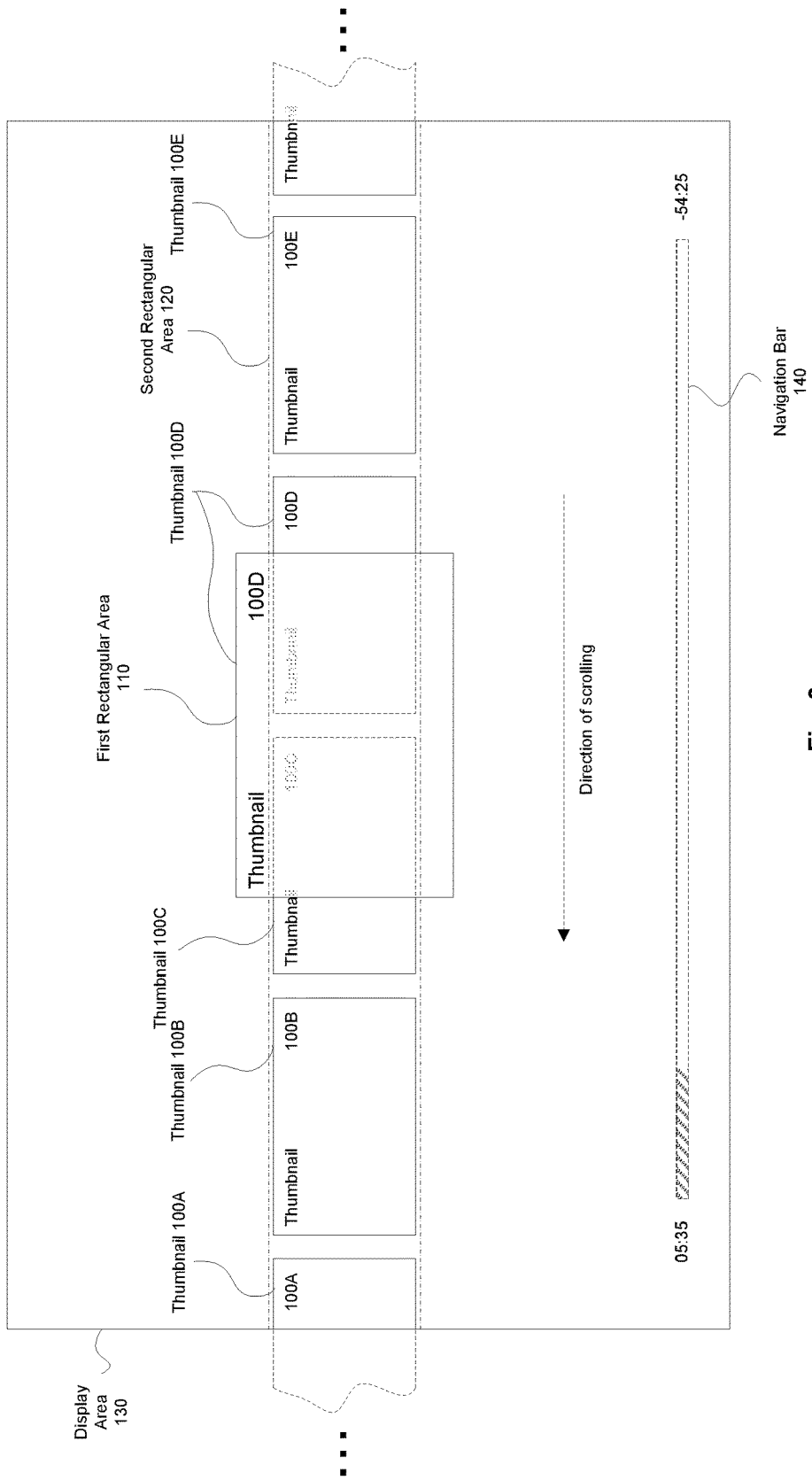
FIG. 3 is a diagram illustrating the GUI after the strip of thumbnails has been further scrolled to the left, according to some embodiments.

FIG. 3 is a diagram illustrating the GUI after the strip of thumbnails has been further scrolled to the left, according to some embodiments. As shown in the diagram, the strip of thumbnails has further scrolled to the left (e.g., in response to a user performing a swipe gesture from right to left) such that: 1) a larger portion of thumbnail 100C in the strip of thumbnails is revealed to the left of the currently selected thumbnail in the first rectangular area 110 and 2) a larger portion of thumbnail 100D is hidden behind the currently selected thumbnail in the first rectangular area 110. Other thumbnails 100 in the strip of thumbnails have been scrolled to the left correspondingly. In this example, the strip of thumbnails has been sufficiently scrolled such that thumbnail 100D in the strip of thumbnails is now the closest thumbnail 100 to the center of the first rectangular area 110. As such, the first rectangular area 110 is updated to display thumbnail 100D instead of thumbnail 100C as being the currently selected thumbnail. With regard to the labeling inside the rectangles illustrating the thumbnails 100, the following is shown: 1) with regard to thumbnail 100B in the strip of thumbnails, "Thumbnail 100B" is black; 2) with regard to thumbnail 100C in the strip of thumbnails, "Thumbna" is black and "il 100C" is grey; 3) with regard to thumbnail 100D, "Thumbnail 100D" is black in the version in the first rectangular area 110, while the version is the strip of thumbnails has "Thumbnail" in grey and "100D" in black.

In one embodiment, the navigation bar 140 may also be updated to reflect that thumbnail 100D is now the currently selected thumbnail by conveying the time position associated with thumbnail 100D (instead of the time position associated with thumbnail 100C), which in this example is 5 minutes and 35 seconds into the video (5:35) with 54 minutes and 25 seconds remaining in the video (−54:25).

Figure 4:
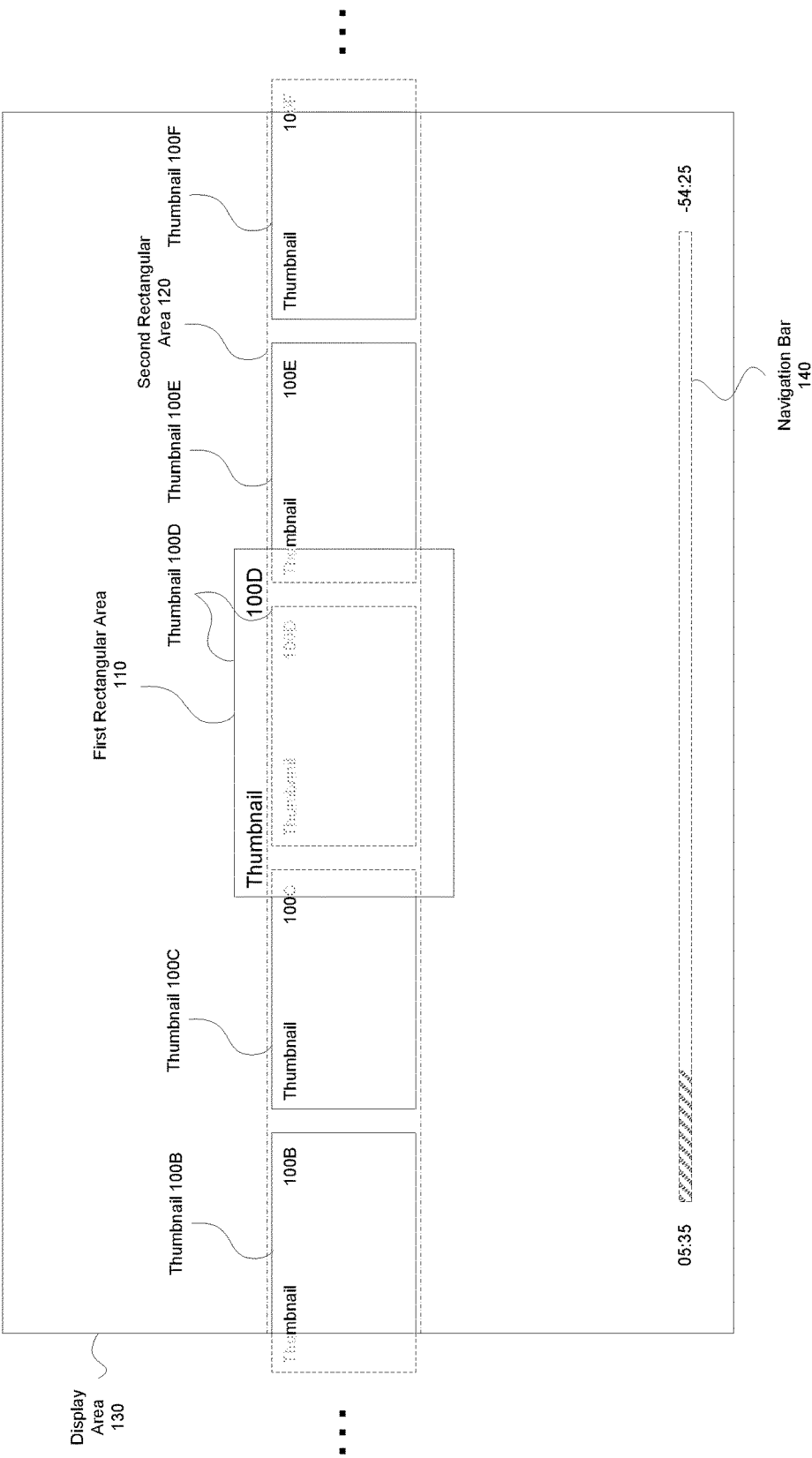
FIG. 4 is a diagram illustrating the GUI after the strip of thumbnails has been even further scrolled to the left, according to some embodiments.

FIG. 4 is a diagram illustrating the GUI after the strip of thumbnails has been even further scrolled to the left, according to some embodiments. As shown in the diagram, the strip of thumbnails has further scrolled to the left (e.g., in response to a user performing a swipe gesture from right to left) such that thumbnail 100D in the strip of thumbnails is completely hidden behind the currently selected thumbnail in the first rectangular area 110. Other thumbnails 100 in the strip of thumbnails have been scrolled to the left correspondingly. For example, a larger portion of thumbnail 100F is now displayed in the right side of the display area 130 while thumbnail 100B has started to transition out of the display area 130. In this example, thumbnail 100D in the strip of thumbnails is still the closest to the center of the first rectangular area 110, and thus thumbnail 100D is still the currently selected thumbnail that is displayed in the first rectangular area 110. With regard to the labeling inside the rectangles illustrating the thumbnails 100, the following is shown: 1) with regard to thumbnail 100C in the strip of thumbnails, "Thumbnail 100" is black and "C" is grey; 2) with regard to thumbnail 100D, "Thumbnail 100D" is black in the version in the first rectangular area 110, while the version in the strip of thumbnails has "Thumbnail 100D" in grey; and 3) with regard to thumbnail 100E in the strip of thumbnails, "Thu" is grey and "mbnail 100E" is black.

The action shown across FIGS. 1-4 of incrementally increasing (FIG. 2) and decreasing (FIG. 3) the visible amount of the currently selected thumbnail duplicated in the second rectangular area 120 to the left (FIG. 2) and right (FIG. 3) of the first rectangular area 110 provides the user with: 1) the perception that the strip of thumbnails in the second rectangular area 120 is a separate item from the version of the currently selected thumbnail in the first rectangular area 110; 2) a visual representation of the degree to which the strip of thumbnails has been scrolled relative to the currently selected thumbnail in the first rectangular area 110 (in addition to the visual representation provided by the movement, including incrementally increasing or decreasing the visible parts as necessary, of other thumbnails 100 in the second rectangular area 110); and 3) a visual representation of how close the scrolling is to causing the currently selected thumbnail to switch to the next thumbnail 100 in the strip of thumbnails (e.g., the switch shown from thumbnail 100C in FIG. 2 to thumbnail 100D in FIG. 3).

The enhanced video navigation GUI described herein allows the user to navigate a video in an intuitive way by scrolling through a strip of thumbnails that is overlaid with a currently selected one of the thumbnails. The currently selected thumbnail can be displayed in the center, and the thumbnails in the strip of thumbnails horizontally across the middle, of the display area 130 where the video is normally played (e.g., overlaying the video while the video is paused), which allows the thumbnails 100 to be larger and easier to see (e.g., compared to displaying one of the thumbnails 100 over a portion of the navigation bar 140 when the user hovers their cursor over that portion). Also, since the horizontal navigation bar is not needed to navigate, the size of the horizontal navigation bar being limited by the width of the display screen (or part thereof being used to display the video) does not impact the ability of the user to use the input mechanism to select a desired time position in the video from which playback should begin. Also, since the video can be navigated using precise affordances (e.g., using swipe gestures or keyboard instead of a mouse), the time increment between thumbnails 100 can be consistent and shorter. Also, navigating the video with these precise affordances gives the user more precise control.

In one embodiment, a user can use an input mechanism to begin playing the video starting at the time position in the video that is associated with the currently selected thumbnail in the first rectangular area 110. For example, in an embodiment where the GUI is displayed on a touchscreen display, the user may perform a tap gesture on the display to begin playing the video at the time position associated with the currently selected thumbnail in the first rectangular area 110. This, for instance, avoids the problem, in systems which rely on the position of a finger on a touch screen relative to a displayed horizontal navigation bar to indicate the time position at which playback should begin, of the action of the user lifting their finger causing the selection of a different time position in the video. Other mechanisms for beginning playback of the video are possible (e.g., pressing enter key on a keyboard or pressing play button on a remote control).

FIG. 5 is a flow diagram of a process for allowing a user to navigate a video, according to some embodiments. In one embodiment, the process is performed by an electronic device such as client electronic device running a media player application. The video may be associated with a plurality of thumbnails (e.g., that were generated from the video), where each thumbnail is associated with a time position in the video, and where one of the plurality of thumbnails is a currently selected thumbnail. The process can be implemented using software, hardware, firmware, or any combination thereof. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The client electronic device causes a display of the currently selected thumbnail in a first rectangular area 110 overlaying a bidirectionally scrollable strip of thumbnails in a second rectangular area 120 having the plurality of thumbnails 100 logically arranged in order from left to right according to their associated time positions (block 510). In one embodiment, the currently selected thumbnail in the first rectangular area 110 is the one of the plurality of thumbnails 100 in the bidirectionally scrollable strip of thumbnails that is closest to a center of the first rectangular area 110. In one embodiment, at least part of the currently selected thumbnail in the first rectangular area 110 overlays the currently selected thumbnail in the bidirectionally scrollable strip of thumbnails. In one embodiment, the currently selected thumbnail in the first rectangular area 110 is greater than 1 and less than 2 times larger than the thumbnails 100 in the bidirectionally scrollable strip of thumbnails in the second rectangular area 120. In one embodiment, the first rectangular area 110 is at the center of a display area 130. In one embodiment, the first rectangular area 110 has left and right edges that are equal distant from left and right edges of the display area 130, where a leftmost part and a rightmost part of the second rectangular area 120 respectively extend from the left and right edges of the first rectangular area 110 to the left and right edges of the display area 130, where the leftmost part and the rightmost part of the second rectangular area 120 are each wider than one of the thumbnails 100 in the bidirectionally scrollable strip of thumbnails in the second rectangular area 120. In one embodiment, the leftmost part includes at least part of one of the thumbnails 100 when the rightmost part includes none of the thumbnails 100 (e.g., when the last thumbnail 100 in the strip of thumbnails is the currently selected thumbnail), and the rightmost part includes at least part of one of the thumbnails 100 when the leftmost part includes none of the thumbnails 100 (e.g., when the first thumbnail 100 in the strip of thumbnails is the currently selected thumbnail). In one embodiment, the bidirectionally scrollable strip of thumbnails overlays the video while the video is paused. In one embodiment, the client electronic device causes the display of the currently selected thumbnail in the first rectangular area 110 (and the strip of thumbnails in the second rectangular area 120) in response to data reflecting a swipe gesture from the user.

Responsive to data reflecting a swipe gesture in a direction from a user, the client electronic device causes an update to the display of the bidirectionally scrollable strip of thumbnails to reflect inertial scrolling in the direction, where the direction is left or right, where the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area 110 and a preceding or following one of the thumbnails 100 in the bidirectionally scrollable strip of thumbnails is selected as the currently selected thumbnail because it is now the closest to the center of the first rectangular area 110 (block 520). In one embodiment, the client electronic device causes playback of the video starting at a time position associated with the currently selected thumbnail in response to data reflecting a tap gesture from the user.

According to another aspect (which may be independent of the GUI features described in FIGS. 1-5, and thus may be used independent of (FIGS. 6-9) or in conjunction with (FIGS. 10-13) the GUI features of FIGS. 1-5), the enhanced GUI provides a manner of transitioning, from a seek request within a video to playing the video, that appears to the user to reduce the delay between the selection of one of the thumbnails and when the video starts playing from the time position corresponding to that selected thumbnail. More particularly, when a user makes a request to seek to a particular time position in the video that is associated with a thumbnail, an expanded version of the thumbnail is displayed (e.g., to fill the entire display area being used for playback of the video) while the video is being buffered. This gives the user the perception that the video is loaded almost instantaneously even though the video is still being buffered. When the video has finished buffering (e.g., a sufficient amount of the video has been streamed to and buffered to start playback), the video is played starting at the time position associated with the thumbnail to provide a seamless transition from the expanded version of the thumbnail to playback of the video.

Figure 6:
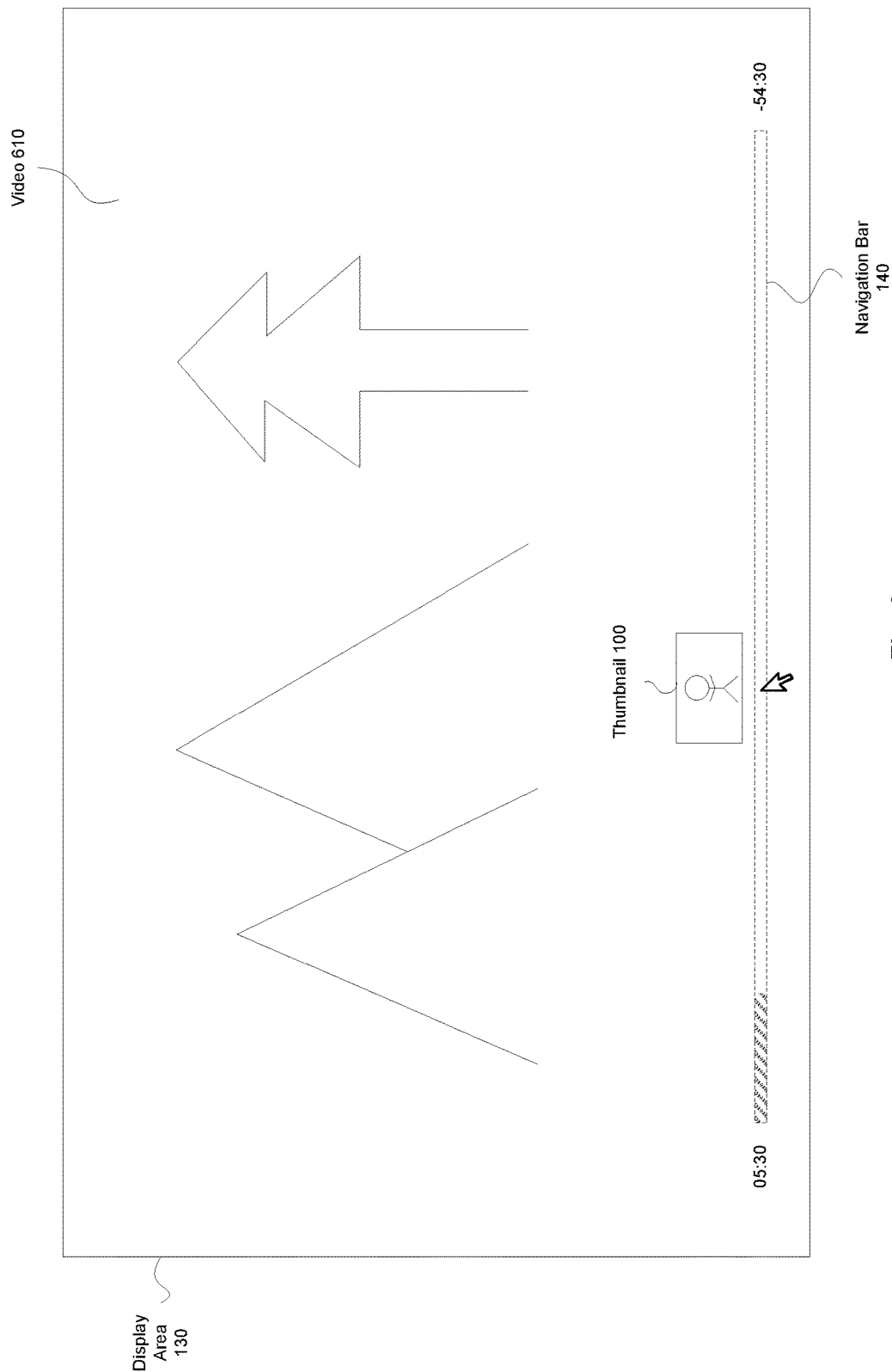
FIG. 6 is a diagram illustrating a video being played in a display area before a user requests a seek operation, according to some embodiments.

FIG. 6 is a diagram illustrating a video being played in a display area before a user requests a seek operation, according to some embodiments. As shown in the diagram, the video 610 is played in a display area 130 of a display screen. In one embodiment, responsive to input from the user, a navigation bar 140 may be displayed in the display area 130 to allow the user to view their current viewing position in the video 610 and to allow the user to navigate the video 610 if desired. In this example, the navigation bar 140 overlays a bottom portion of the video 610. It should be understood, that the navigation bar 140 can be positioned elsewhere in the display area 130. As shown in the diagram, the navigation bar 140 indicates that the current time position in the video 610 is at the 5 minute and 30 second (5:30) mark (with 54 minutes and 30 seconds remaining in the video 610 (−54:30)). Also, as shown in the diagram, the user's cursor is hovering over a portion of the navigation bar 140, above which a thumbnail 100 is displayed. The thumbnail 100 provides a (still-image) preview of the content at the particular time position in the video 610 corresponding to the cursor's position along the navigation bar 140. The user may click on that portion of the navigation bar 140 to seek (or jump) to that time position in the video 610. Typically, with streaming video, there is a noticeable delay between the time that the user makes the request to seek to a particular time position in the video 610 and when the video 610 starts playing due to various network and processing delays (e.g., for the video 610 to be sufficiently buffered and to perform encoding and/or decoding and encryption and/or decryption).

In one embodiment, as will be described in additional detail below, an expanded version of the thumbnail 100 is generated and displayed in the display area 130 (e.g., to fill the entire display area being used to play the video) while the video 610 is being buffered to give the user the perception that playback at the new time position begins almost instantaneously even though the video is still being buffered. When the video has finished buffering (e.g., a sufficient amount of the video has been streamed to and buffered to start playback), the video is played starting at the time position associated with the thumbnail 100 to provide a seamless transition from the expanded version of the thumbnail 100 to playback of the video.

Figure 7:
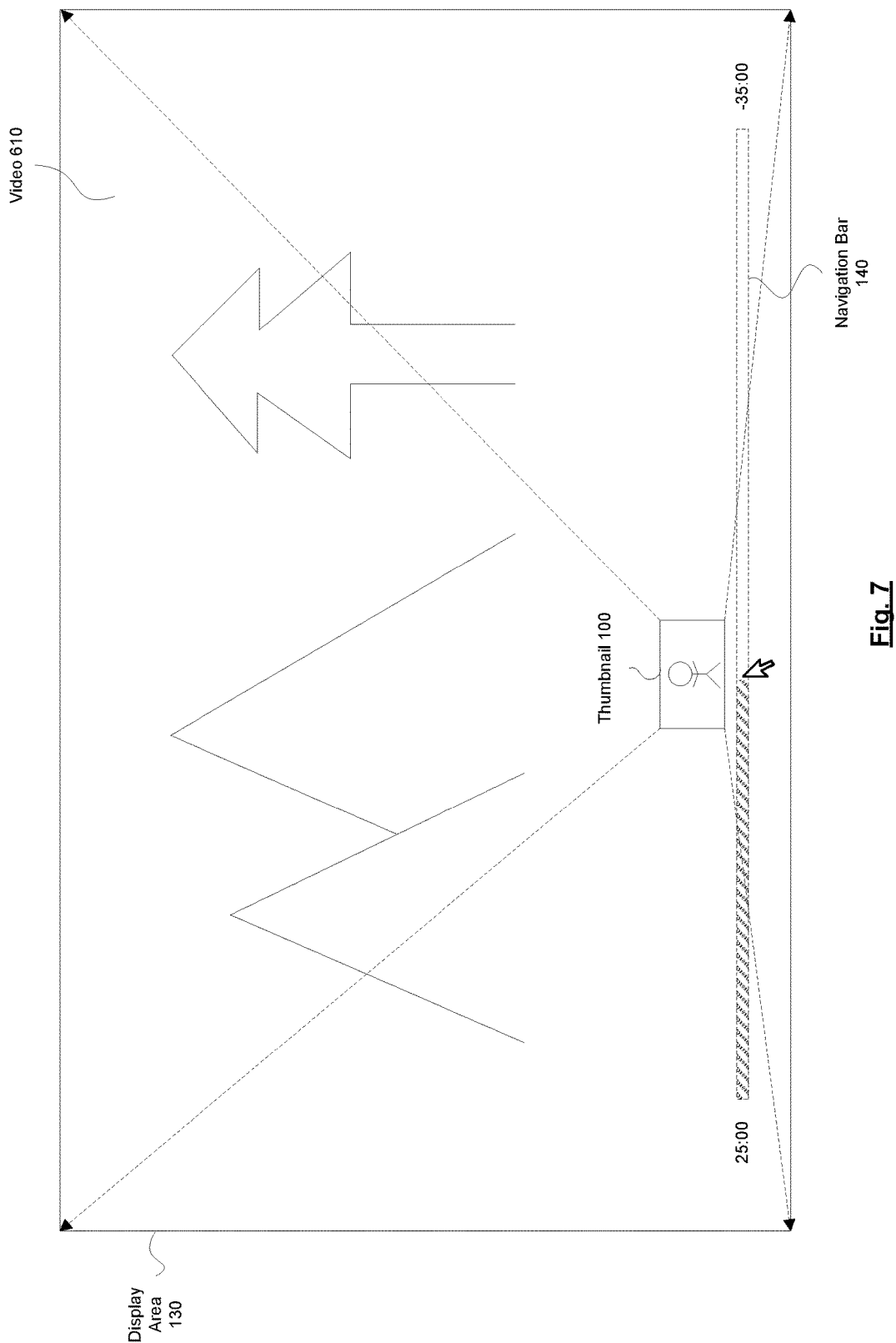
FIG. 7 is a diagram illustrating a thumbnail being expanded to fill the display area after the user requests a seek operation, according to some embodiments.
Figure 8:
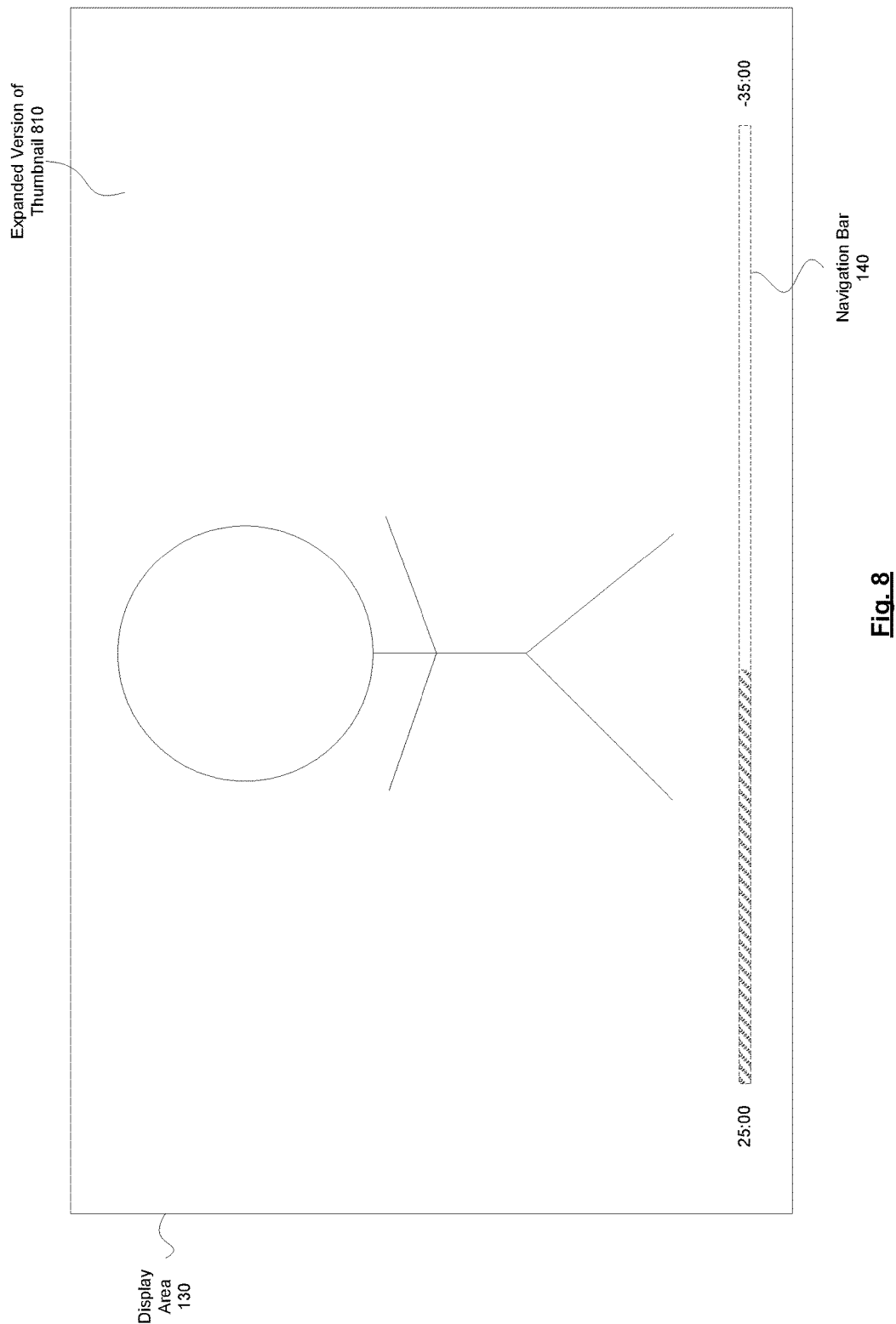
FIG. 8 is a diagram illustrating the expanded version of the thumbnail filling the display area, according to some embodiments.

FIG. 7 is a diagram illustrating a thumbnail being expanded to fill the display area after the user requests a seek operation, according to some embodiments. As shown in the diagram, when the user clicks on the navigation bar 140 (to seek to the time position associated with the thumbnail 100), the thumbnail 100 is expanded to fill the entire display area 130 (while the video 610 is being buffered). While in one embodiment the thumbnail 100 is expanded such that the user can visually perceive the expansion of the thumbnail 100 (e.g., user can see the thumbnail 100 grow larger in size over time until it fills the entire display area 130), in other embodiments switch directly from what is shown in FIG. 6 to FIG. 8. The fully expanded thumbnail may be referred to herein as the expanded version of the thumbnail. In one embodiment, the expanded version of the thumbnail is generated based on enlarging the original thumbnail 100 and optionally applying image enhancement techniques (e.g., interpolation) to reduce loss of image quality that may be caused by the enlargement (that is, relative to a frame in the video, image information/resolution was reduced in generating the thumbnail for that frame (which loss of information/resolution will be more evident the larger the image is displayed), and image enhancement techniques may be used to compensate for this loss so it is less evident upon expanding/stretching the thumbnail 100 to fill the display area 130). In one embodiment, the expanded version of the thumbnail is generated based on a higher resolution version of the thumbnail 100 (e.g., an image with a resolution equal to the size of the display area 130) that is fetched when the user requests to seek to the time position associated with the thumbnail. Retrieving this higher resolution version of the thumbnail 100 would take longer than enlarging (and enhancing) the regular thumbnail 100, but would still take less time than the time that it takes to sufficiently buffer the video 610 for playback. This has the advantage that the expanded version of the thumbnail will have a higher resolution (closer to the resolution of the video compared to a regular thumbnail 100), while still being available before the video is sufficiently buffered. In one embodiment, the navigation bar 140 is updated to indicate the new time position in the video 610 (which in this example is 25:00).

FIG. 8 is a diagram illustrating the expanded version of the thumbnail filling the display area, according to some embodiments. The expanded version of the thumbnail 810 fills the entire display area 130 (e.g., the same area that was and will be used to play the video 610) while the video is being buffered. The expanded version of the thumbnail 810 can be generated and displayed almost immediately after the user requests the seek operation since the original thumbnail 100 should already be available or can be obtained relatively quickly (e.g., compared to the time it takes to sufficiently buffer the video 610 for playback). This gives the user the perception that the video is loaded almost instantaneously even though the video 610 is still being buffered.

Figure 9:
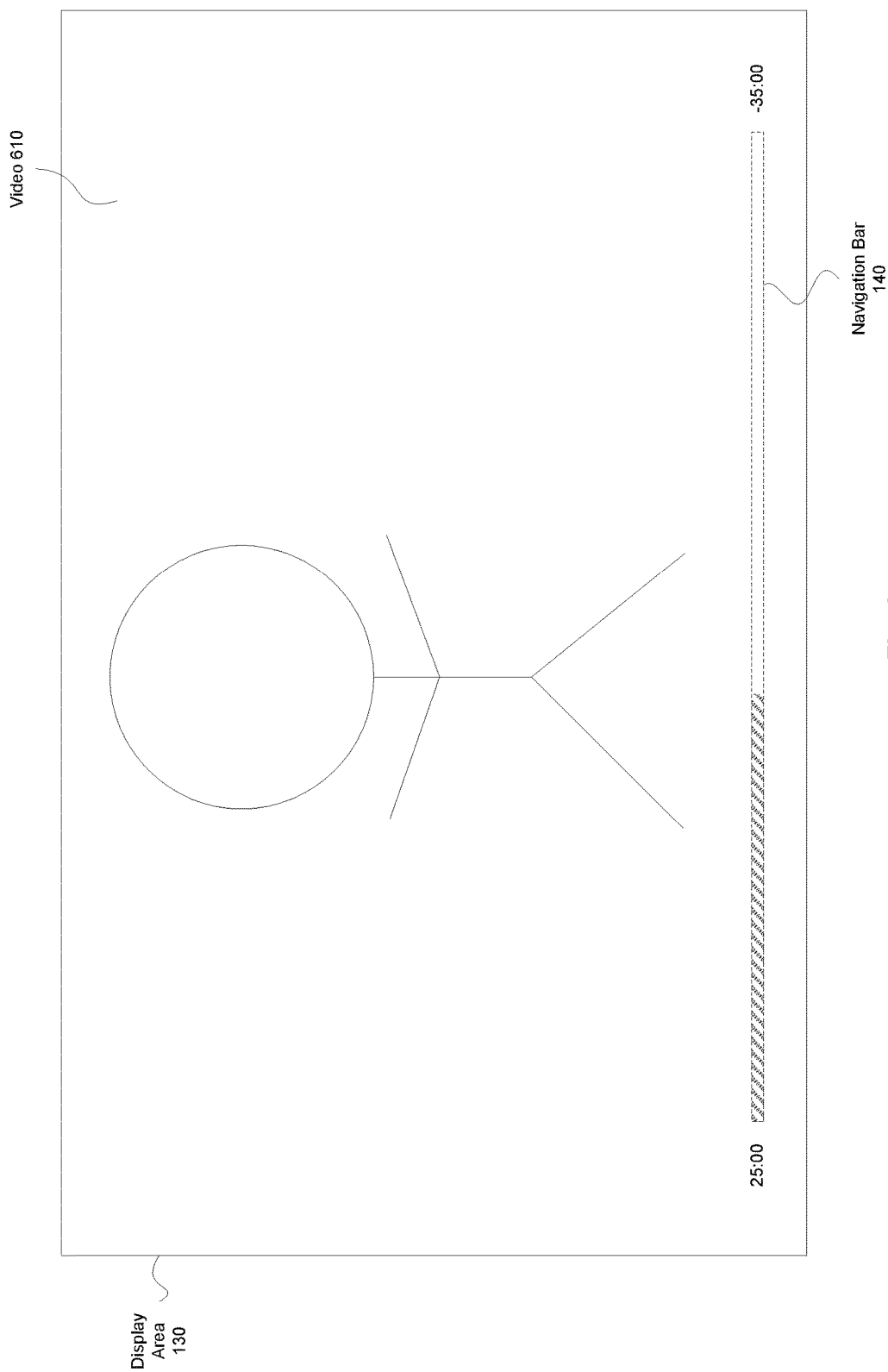
FIG. 9 is a diagram illustrating the video being played in the display area after a threshold amount of the video has buffered, according to some embodiments.

FIG. 9 is a diagram illustrating the video being played in the display area after a threshold amount of the video has buffered, according to some embodiments. As shown in the diagram, once a threshold amount of the video has been buffered, the video starts playing in the display area 130 starting at the time position associated with thumbnail 100 (which in this example is at the 25 minute mark (25:00)). This provides a seamless transition from the expanded version of the thumbnail 810 to playback of the video. The transition may be transparent to the user in the sense that the expanded version of the thumbnail 810 may appear to the user as being a part of the playback of the video 610 rather than a thumbnail.

As will be shown and described with reference to FIGS. 10-12, this technique for displaying an expanded version of a thumbnail 810 in the display area 130 after a user requests a seek operation (while the video is being buffered) can be applied in other contexts that implement different GUIs for navigating a video. For example, the technique can be applied in a context that implements the GUI shown and described with reference to FIGS. 1-5 or similar GUI.

Figure 10:
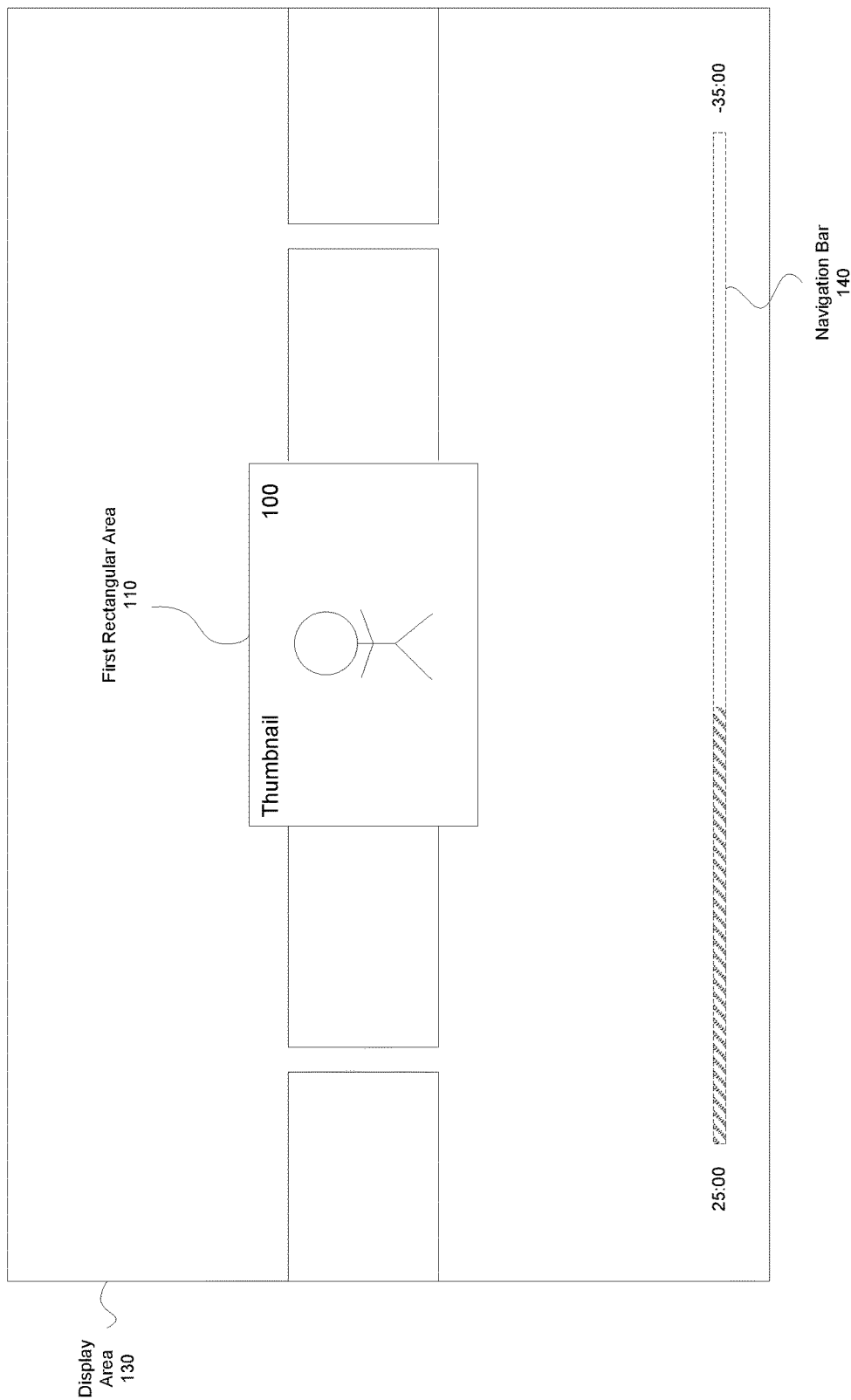
FIG. 10 is a diagram illustrating a GUI for allowing a user to navigate a video, according to some embodiments.
Figure 11:
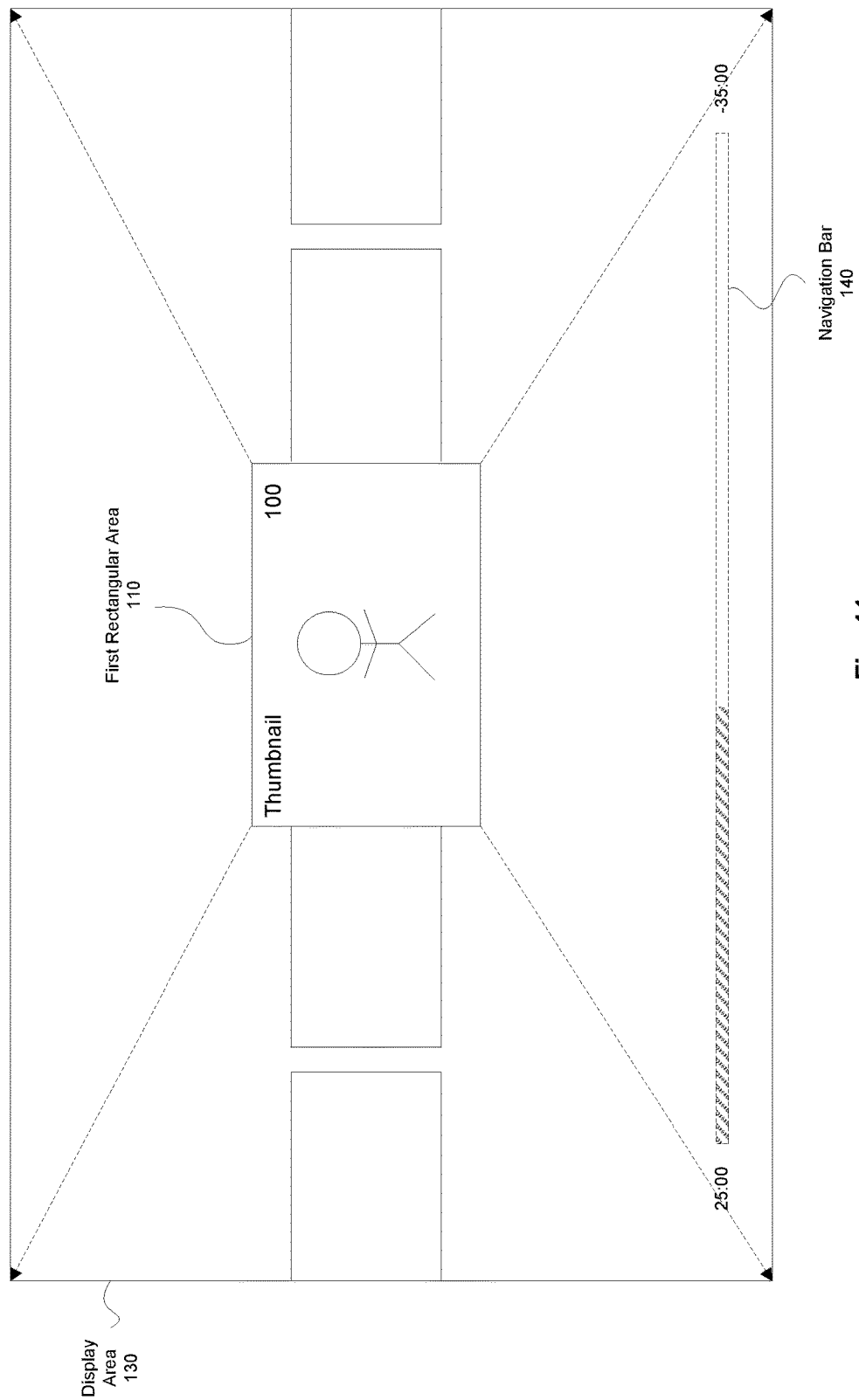
FIG. 11 is a diagram illustrating a thumbnail being expanded to fill the display area after the user requests a seek operation, according to some embodiments.

FIG. 10 is a diagram illustrating a GUI for allowing a user to navigate a video, according to some embodiments. The GUI is similar to the GUI shown in FIGS. 1-4 in that it includes a strip of thumbnails that is overlaid by a thumbnail 100 in the first rectangular area 110. It should be noted that some of the annotations included in FIGS. 1-4 (e.g., the second rectangular area 120, the dashed lines to show hidden portions of the thumbnails in the strip of thumbnails, as well as the labels and reference numerals for the thumbnails in the strip of thumbnails) have been omitted in this diagram for sake of clarity. A user may use an input mechanism to scroll through the strip of thumbnails to locate a desired time position in the video. The user may then select a particular thumbnail 100 to seek (jump) to the time position in the video associated with the thumbnail 100 (e.g., by performing a tap gesture on the display when the thumbnail 100 is displayed in the first rectangular area 110). In this example, the user selects the thumbnail 100 associated with the time position 25:00. Similar to FIG. 7, FIG. 11 shows that, when the user selects the thumbnail 100, the thumbnail 100 is expanded to fill the entire display area 130. Similar to that described with reference to FIGS. 8 and 9, the expanded version of the thumbnail 810 is then displayed in the display area 130 while the video 610 is being buffered (as in FIG. 8), and once a threshold amount of the video 610 has been buffered, the video starts playing in the display area 130 starting at the time position associated with the thumbnail 100 (which in this example is at the 25 minute mark (25:00)) (as in FIG. 9).

Figure 12:
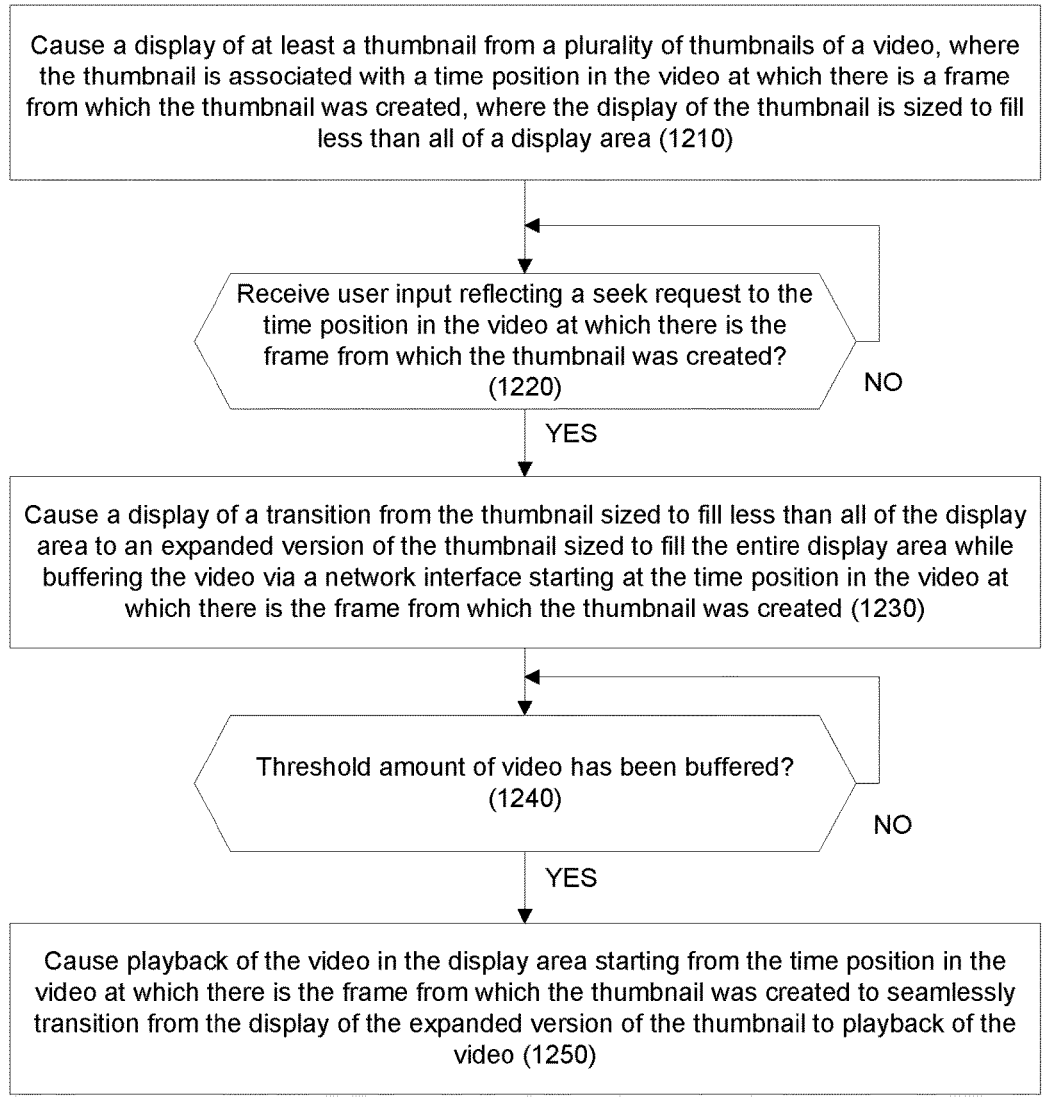
FIG. 12 is a flow diagram of a process for transitioning from a seek request within a video to playing the video, according to some embodiments.

FIG. 12 is a flow diagram of a process for transitioning from a seek request within a video to playing the video, according to some embodiments. In one embodiment, the process is performed by an electronic device such as client electronic device running a media player application. The video may be associated with a plurality of thumbnails (e.g., that were generated from the video), where each thumbnail is associated with a time position in the video. The process can be implemented using software, hardware, firmware, or any combination thereof.

The client electronic device causes a display of at least a thumbnail 100 from a plurality of thumbnails of a video, where the thumbnail 100 is associated with a time position in the video 610 at which there is a frame from which the thumbnail 100 was created, where the display of the thumbnail 100 is sized to fill less than all of a display area 130 (block 1210). In one embodiment, the thumbnail 100 sized to fill less than all of the display area 130 is displayed above a portion of a navigation bar 140 that corresponds to the time position in the video 610 at which there is the frame from which the thumbnail 100 was created. In one embodiment, the thumbnail 100 sized to fill less than all of the display area is displayed as part of a scrollable strip of thumbnails (e.g., as shown in FIG. 10). In one embodiment, the thumbnail 100 sized to fill less than all of the display area 130 is sized to fill less than 50 percent of the display area 130 and has a lower resolution than the video 610.

The client electronic device determines whether it has received a user input reflecting a seek request to the time position in the video 610 at which there is the frame from which the thumbnail 100 was created (decision block 1220). If the client electronic device does not receive such a user input, then the client electronic device may wait until it receives such a user input. If the client electronic device receives such a user input, then the client electronic device causes a display of a transition from the thumbnail 100 sized to fill less than all of the display area 130 to an expanded version of the thumbnail 810 sized to fill the entire display area 130 while buffering the video 610 via a network interface starting at the time position in the video 610 at which there is the frame from which the thumbnail 100 was created (block 1230). In one embodiment, the expanded version of the thumbnail 810 is generated based on applying image enhancement techniques (e.g., interpolation) to the thumbnail 100 to reduce loss of image quality that may be caused by the enlargement. In one embodiment, the expanded version of the thumbnail is generated based on a higher resolution version of the thumbnail 100 that is fetched responsive to the user input reflecting the seek request to the time position in the video 610 at which there is the frame from which the thumbnail 100 was created. In an embodiment where the thumbnail 100 sized to fill less than all of the display area 130 is displayed above a portion of a navigation bar 140 that corresponds to the time position in the video 610 at which there is the frame from which the thumbnail 100 was created, the user input reflecting the seek request may be a click (e.g., using a mouse) on the portion of the navigation bar 140 that corresponds to the time position in the video 610 at which there is the frame from which the thumbnail 100 was created. In an embodiment where the thumbnail 100 sized to fill less than all of the display area 130 is displayed as part of a scrollable strip of thumbnails, the user input reflecting the seek request may be a tap gesture (e.g., on a touchscreen display) while the thumbnail 100 is the currently selected thumbnail in the scrollable strip of thumbnails. In one embodiment, the display of the transition from the thumbnail 100 sized to fill less than all of the display area 130 to the expanded version of the thumbnail 810 sized to fill the entire display area is gradual such that the user can visually perceive the transition happening.

The client electronic device then determines whether a threshold amount of video 610 has been buffered (decision block 1240). If a threshold amount of video 610 has not been buffered, then the client electronic device keeps buffering the video 610. If a threshold amount of video 610 has been buffered, then the client electronic device causes playback of the video 610 in the display area 130 starting from the time position in the video 610 at which there is the frame from which the thumbnail 100 was created to seamlessly transition from the display of the expanded version of the thumbnail 810 to playback of the video 610 (block 1250).

Figure 13:
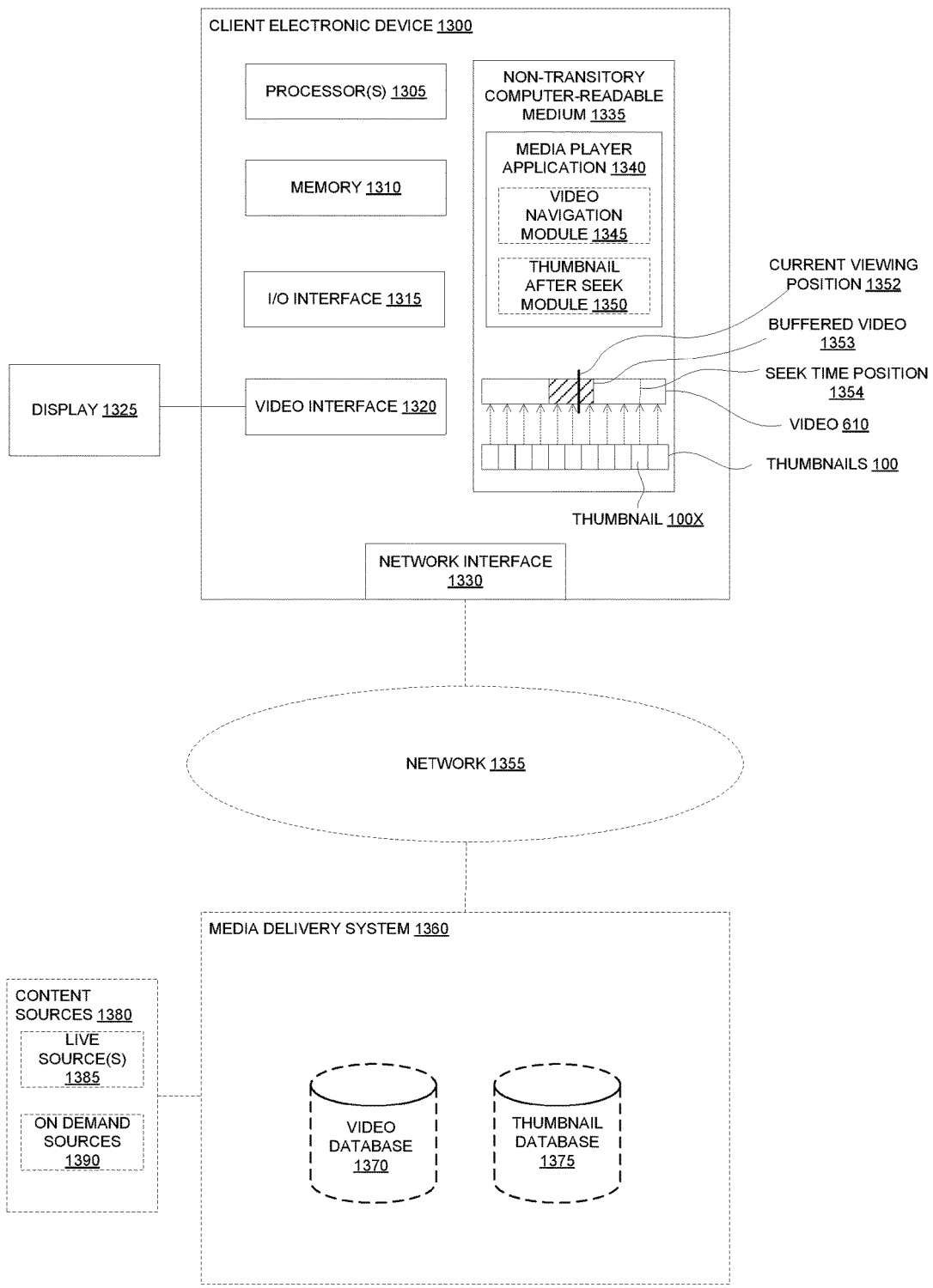
FIG. 13 is a block diagram illustrating a video streaming system, according to some embodiments.

FIG. 13 is a block diagram illustrating a video streaming system, according to some embodiments. The system includes a client electronic device 1300 that is communicatively coupled to a media delivery system 1360 over a network 1355. In an embodiment, a client electronic device 1300 is an electronic device that is able to request video content (also referred to simply as "video") from the media delivery system 1360 and to play video content served by the media delivery system 1360. The media delivery system 1360 is a remote service configured to receive requests for video content from the client electronic device 1300 and to serve the requested video content to the client electronic device 1300. Although one client electronic device 1300 is shown in FIG. 13, the system can include more than one client electronic device 1300 and typically may include many separate client electronic devices 1300. Furthermore, the media delivery system 1360 can include additional components such as processors, storage servers, authentication servers, firewalls, and load balancers, which are not shown here for sake of clarity.

As shown in the diagram, the client electronic device 1300 includes one or more processors 1305, a memory 1310, an input/output (I/O) interface 1315, a video interface 1320, a network interface 1315, and a non-transitory computer-readable medium 1335. The processors 1305 may be, for example, general purpose microprocessors. The memory 1310 may be a Random Access Memory (RAM) or other dynamic or volatile storage device for storing data and instructions to be executed by the processors 1305. Memory 1310 may also be used for storing temporary variables or other intermediate information during execution of instructions to be executed by the processors 1305. Such instructions, when stored in the non-transitory computer-readable medium 1335, render client electronic device 1300 to be a special-purpose machine that is customized to perform the operations specified by the instructions.

In one embodiment, the non-transitory computer-readable medium 1335 includes a video navigation module 1345 and a thumbnail after seek module 1350 that are included as part of a media player application 1340. Media player application 1340 may be an application that allows users to browse and play video accessible from a media delivery system 1360. The video navigation module 1345 and the thumbnail after seek module 1350 may include code/instructions, that when executed by the processors 1305, cause the client electronic device 1300 to perform operations of one or more embodiments described herein related to causing display of a GUI to allow a user to navigate a video and transitioning from a seek request within a video to playing the video, respectively.

The I/O interface 1315 is configured to receive user input from a user via an input device. The input device may be any type of device that can receive user input such as a keyboard, a mouse, a touchscreen panel affixed to a display, a trackpad, or a remote control. Other examples of suitable input devices include cameras, microphones, accelerometers, motion detectors, brain-machine interfaces, and/or other sensors.

The video interface 1320 is communicatively coupled to a display 1325 and is configured to output video content to the display 1325. The display 1325 may be any type of device that can display video content, the possible types of displays including, but not limited to, a television, a computer monitor, or a touchscreen display. While the display 1325 is shown as being separate from the client electronic device 1300, in some embodiments, the display 1325 is integrated with the client electronic device 1300.

The client electronic device 1300 may be any type of device that can request and receive video content and can output video content to a display 1325. For example, a client electronic device 1300 can comprise a mobile device, a tablet computer, a desktop computer, a set-top box (STB), a smart TV, a video game console, a digital media player, a digital versatile disk (DVD) player, or a Blu-Ray player.

The data network 1355 can be any type of network capable of transporting data from one device to another device (for example, from a client electronic device 1300 to media delivery system 1360 and from media delivery system 1360 to one or more client electronic devices 1300). For example, the data network 1355 can include any combination of the internet, a Wide Area Network (WAN), a Local Area Network (LAN), a cellular communications network, a telephone network, a terrestrial analog or digital signal system, a cable system, and a satellite communications system.

The media delivery system 1360 includes a video database 1370 and a thumbnail database 1375. In an embodiment, the media delivery system 1360 can be implemented across any number of hardware devices and platforms in a distributed manner. In an embodiment, the media delivery system 1360 ingests video content from content sources 1380, such as one or more live content source(s) 1385 (for example, live linear programming from one or more broadcast sources), one or more on demand content sources 1390 (for example, one or more video-on-demand (VOD) content services), or both, and stores some or all of the ingested video content in the video database 1370 to be served to client electronic devices 1300. The media delivery system 1360 may store thumbnails for some or all of the ingested video content in the thumbnail database 1375. For example, video content items (for example, television episodes, movies, VOD programs, and so forth) stored in the video database 1370 may be associated with corresponding sets of thumbnails. In an embodiment, the set of thumbnails associated with a video content item can include thumbnails where each thumbnail is associated with a particular time position in the video content. For example, the set of thumbnails for a particular video content item might include a thumbnail for every five (5) second increment in the video content. More granular or less granular thumbnail increments are also possible.

In an embodiment, certain components of the media delivery system 1360 can be implemented in full or in part using "cloud"-based components that are coupled to the systems by one or more networks, such as the internet. The cloud-based components may expose interfaces by which they provide processing, storage, software, and/or other resources to other components of the systems. In an embodiment, the cloud-based components may be implemented by third-party entities on behalf of another entity for whom the components are deployed. In other embodiments, the described systems may be implemented entirely by computer systems owned and operated by a single entity.

During operation of the system, a client electronic device 1300 may generate and transmit one or more requests to the media delivery system 1360 to play or otherwise access particular video content items. In response to receiving such requests, the media delivery system 1360 may serve the requested video content items to the client electronic devices 1300. This may involve transmitting video content stored in the video database 1370, as well as thumbnails associated with the video content stored in the thumbnail database 1375, to the client electronic devices 1300 over the network 1355. The client electronic devices 1300 may buffer a portion of the received video content (e.g., video 610) in the non-transitory machine-readable medium 1335 and output the buffered video content to the display 1325. In one embodiment, as shown in the diagram, the client device 1300 buffers a threshold amount of video content following (and preceding) the user's current viewing position 1352 in the video 610 (e.g., buffered video 1353). The client electronic device 1300 may also store some or all of the thumbnails 100 for the video 610 in the non-transitory machine-readable medium 1335. Each thumbnail is associated with a time position in the video 610 (e.g., as indicated by the arrows extending from each of the thumbnails 100 to an associated time position in the video 610). The client device 1300 may use the thumbnails 100 to generate and output (to the display 1325) a GUI that allows a user to navigate a video with a strip of thumbnails, according to embodiments described herein. For example, if a user makes a request to enter video navigation mode, the client device 1300 may generate and output (to the display 1325) a scrollable strip of thumbnails, overlaid with a currently selected one of the thumbnails 100, through which a user can scroll to locate the desired time position in the video 610. Also, independently or in conjunction with the strip of thumbnails, the client device 1300 may use the thumbnails 100 to provide a transition from a seek request within the video 610 to playing the video, according to embodiments described herein. For example, if a user makes a request to seek to seek time position 1354 that is associated with thumbnail 100X, the client device 1300 may generate and output (to the display 1325) an expanded version of thumbnail 100X while the video 610 is being buffered. When a threshold amount of the video 610 is buffered, the client device 1300 may start playing the video 610 starting at the time position associated with thumbnail 100X to provide a seamless transition from the expanded version of thumbnail 100X to playback of the video 610.

While the client electronic device 1300 is shown in the context of media delivery system 1360, in other embodiments, the client electronic device 1300 can perform operations of one or more embodiments described herein in a context where the video 610 is not streamed from a media delivery system 1360. For example, in some embodiments, the video 610 and thumbnails 100 may be downloaded from another content source, copied from a removable storage device, or otherwise accessed by the client electronic device 1300 without having to interact with the media delivery system 1360.

Figure 14:
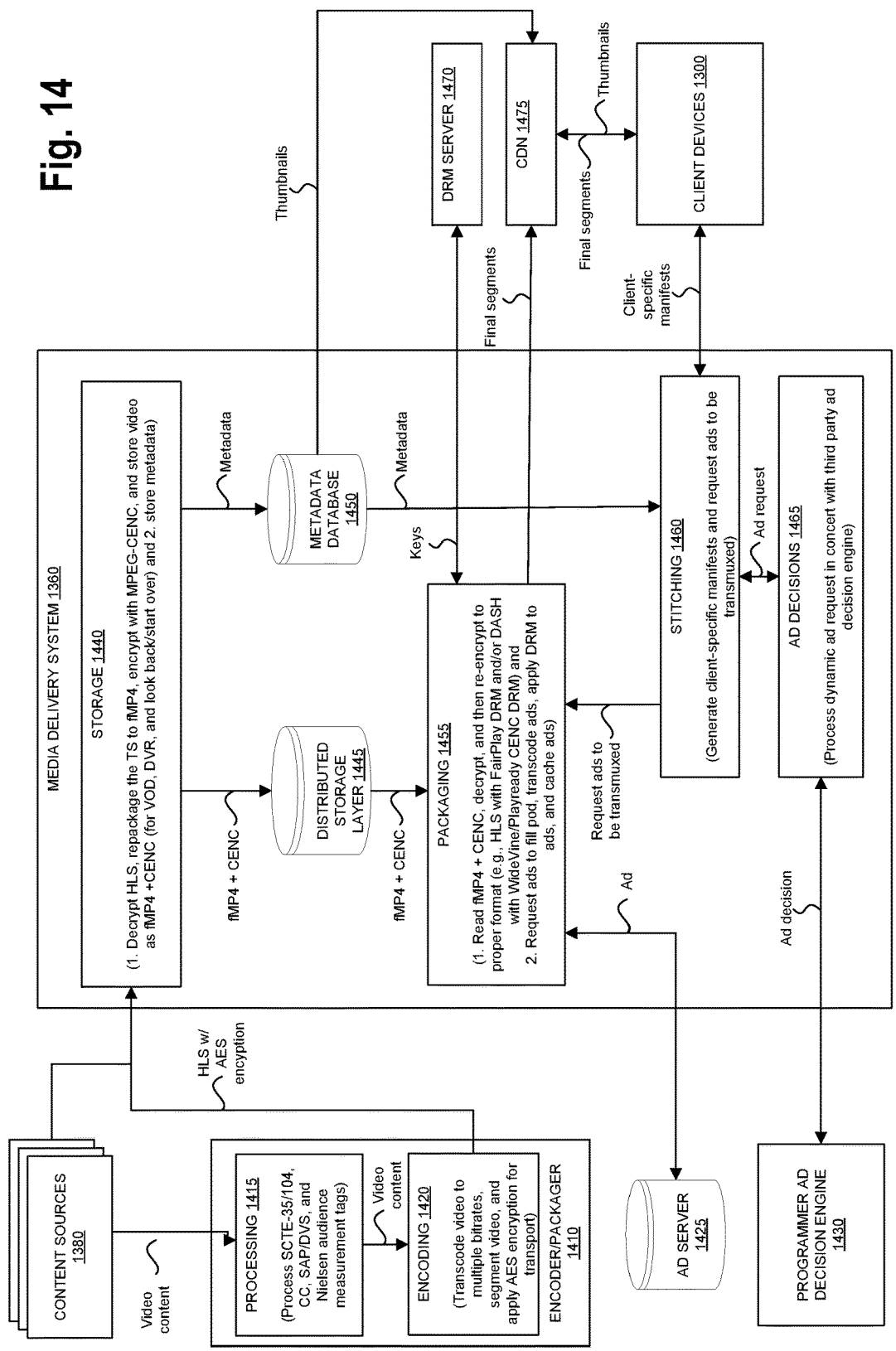
FIG. 14 is a diagram illustrating a video streaming system architecture, according to some embodiments.

FIG. 14 is a diagram illustrating a video streaming system architecture, according to some embodiments. In an embodiment, the system of FIG. 14 includes content sources 1380, an encoder/packager 1410, a media delivery system 1360, an ad server 1425, a programmer ad decision engine 1430, a Digital Rights Management (DRM) server 1470, a Content Distribution Network (CDN) 1475, and client electronic devices 1300. The encoder/packager 1410 includes a processing component 1415 and an encoding component 1420. The media delivery system 1360 includes a storage component 1440, a packaging component 1455, a stitching component 1460, and an ad decisions component 1465.

The content sources 1380 provide video content that is to be consumed by users. The video content can include live content, VOD content, and/or any other type of video content.

The encoder/packager 1410 ingests video content from the content sources 1380. For example, the encoder/packager 1410 can ingest live video content picked up from a signal of a live linear cable network—national or local, where appropriate and agreed upon. As another example, the encoder/packager 1410 can ingest VOD content directly from the programmer itself or via a content aggregation partner. In one embodiment, the encoder/packager 1410 may ingest video content via satellite or terrestrial means. In one embodiment, the encoder/packager 1410 receives Society of Cable and Telecommunications Engineers 35 2013 (SCTE-35) markers in a data Program Information Description (PID) along with the video content. SCTE-35 can be used to signal ad insertion opportunities in the transport stream, which can be used for Dynamic Ad Insertion (DAI). In one embodiment, the encoder/packager 1410 receives Nielsen audience measurement tags in a data PID, or embedded in the audio stream. The Nielsen audience measurement tags can be used to measure audience size and demographic information. The processing component 1415 of the encoder/packager 1410 processes the SCTE-35 markers and the Nielsen audience measurement tags as well as any Closed Captioning (CC) and Second Audio Programming (SAP)/Descriptive Video Service (DVS) information.

In one embodiment, the encoding component 1420 of the encoder/packager 1410 transcodes the video content into multiple bitrates (for example, into several Adaptive Bitrate (ABR) profiles) and places key frames at ad boundaries as informed by the SCTE-35 data. The packager segments the content according to the keyframes placed by the transcoder and encrypts the content for transport (for example, using Advanced Encryption Standard (AES) encryption). In one embodiment, the video is packaged using the Hypertext Transfer Protocol (HTTP) Live Streaming (HLS) protocol with AES encryption and the HLS-encoded video is provided to the media delivery system 1360 (for example, over a private network connection).

In one embodiment, the storage component 1440 of the media delivery system 1360 stores the encoded and encrypted video content, decrypts the video content, repackages the video content to an intermediate format (for example, using fragmented MPEG-4 (fMP4) or any other video streaming format), encrypts the repackaged video (for example, using MPEG Common Encryption (MPEG- CENC)), and stores the encrypted video segments in a distributed storage layer 1445, which serves as the origin for the content distribution network (CDN). In general, the storage component 1440 can store the video in any intermediate file format suitable for transfer to a CDN, directly to client devices, or both. In one embodiment, to provide low-latency access to live content, the media delivery system can act as a fall back origin for the CDN in case the video segments are requested before they have been permanently stored in the distributed storage layer 1445. When a client electronic device 1300 requests a video, the video segments can be repackaged on the fly (just-in-time repackaging) into the appropriate output format. In other embodiments, the video content ingested from content sources 1380 can be stored in its original format (e.g., HLS) without conversion.

In one embodiment, the distributed storage layer 1445 is provided using a cloud-based storage service. Also, the storage component 1440 may store relevant metadata for the video (for example, timestamps and SCTE-35 markers) in a metadata database 1450 (for example, a relational database or other data storage application). In one embodiment, the metadata includes some or all of: information related to ad positions, ad insertion information, thumbnail image files (for example, stored in JPG or PNG format), and information related to the thumbnails such as their associated time positions in the video. For live video, the metadata may include GIF preview animations showing the most recent video (the most recent 15 seconds, for example). In one embodiment, the thumbnails are cached in one or more Content Distribution Networks (CDNs) to be served to clients.

In one embodiment, the media delivery system 1360 ingests mezzanine VOD assets from a programmer via a secure Internet Protocol (IP) connection. The VOD assets may then be processed using a job-based workflow. In one embodiment, the metadata for the VOD assets are ingested and stored in the metadata database 1450 while the mezzanine files are transcoded to fMP4 with CENC and stored in the distributed storage layer 1445.

The packaging component 1455 of the media delivery system 1360 reads the encrypted video segments, decrypts the segments, optionally transmuxes the segments, and then re-encrypts the segments to the proper format. In one embodiment, the re-encrypted formats include HLS with FairPlay Digital Rights Management (DRM), Dynamic Adaptive Streaming over HTTP (DASH) with WideVine/PlayReady CENC DRM, or both. The packaging component 1455 passes through any ID3 tags for Nielsen measurements and communicates with the DRM server 1470 (which manages content license keys) to ensure that all content is encrypted with up-to-date keys. The final video segments are cached in one or more CDNs 1475 to be served to client electronic devices 1300.

The stitching component 1460 of the media delivery system 1360 generates client-specific manifests on the fly (just-in-time manifest creation to allow for fine-grained control over the video stream and the end-user experience). The stitching component 1460 can generate manifests for HLS, DASH, or any manifest format suitable for the client electronic devices 1300. The manifests may be generated based on the metadata stored in the metadata database 1450. Also, the stitching component 1460 may drive dynamic ad insertion (DAI) using a programmer ad decision engine 1430. For example, the stitching component 1460 may send a request to the ad decisions component 1465 for ads to be transmuxed into a video. The ad decisions component 1465 processes the dynamic ad request in concert with a third-party ad decision engine such as the programmer ad decision engine 1430 and provides an indication of the ads to be transmuxed into the video. The stitching component 1460 may then make a request to the packaging component 1455 to transmux the ads. When a client ad pod is upcoming, the packaging component 1455 of the media delivery system 1360 may request the ads from the ad server 1425 to fill the ad pod, transcode the ads, apply DRM to the ads (because some platforms cannot play encrypted content followed by unencrypted content), and cache the ads. The stitching component 1460 serves the manifest that refers to the freshly transcoded ad pod video segments.

In an embodiment, client electronic devices 1300 include a media player application (for example, a media player application 1340) capable of playing streaming video (for example, video content in HLS with FairPlay format or DASH with WideVine/CENC format). When the user selects a video to watch, the client electronic device 1300 requests a manifest for the selected video from the stitching component 1460. In one embodiment, this request is made over HTTP Secure (HTTPS). If the user is not currently streaming more concurrent streams than they are allowed (for example, as determined by the stitching component 1460 or another component of the media delivery system 1360), then the stitching component 1460 generates a manifest that is specific for the client electronic device 1300 and sends the manifest to the client electronic device 1300. The client electronic device 1300 may then begin fetching encrypted video segments from the CDN 1475 according to the manifest. In one embodiment, the encrypted video segments are fetched from the CDN 1475 over HTTPS. The content can be fetched from the CDN 1475 over a public network such as the internet and thus may travel across a variety of networks.

The media delivery system 1360 shown in FIG. 14 may report audience measurement data to Nielsen (or other entities that gather audience measurement data) based on metadata embedded in the video segments. Client electronic devices 1300 may have access to a Nielsen Software Development Kit (SDK) library that enables the client electronic devices 1300 to report audience measurement data or other software to implement similar functionality.

In one embodiment, the media delivery system 1360 shown in FIG. 14 supports the ability to enforce content viewing rules and restrictions according to agreements made with content programmers. For example, these content viewing rules and restrictions may include supporting content blackouts (based on location or device) or content substitutions. In one embodiment, the media delivery system 1360 periodically pulls blackout information from programmers (for example, via agreed upon methods and timeframes). Additionally or alternatively, in one embodiment, the video streaming platform allows programmers to push blackout updates to the media delivery system 1360 through a cloud-hosted and secure Representational State Transfer (REST) Application Programming Interface (API) (for example, that adheres to SCTE-224). In one embodiment, the video streaming platform can accept blackout information in-band via SCTE-35. In one embodiment, blackout information can include information indicating one or more channels to be blacked out, a zip code to be blacked out, device type(s) to be blacked out, a time period for the blackout, or any combination thereof. The backend of the media delivery system 1360 may integrate with a geofencing library that maps client IP addresses to zip codes, which allows the video streaming platform to prevent or stop playback of video content as needed. This process may integrate with the stitching component 1460 or another component of the media delivery system 1360 so that custom slates can be inserted during blackouts as needed. In one embodiment, blackouts are instead indicated as part of program guide data or other metadata provided to the client electronic device 1300, for example, via a separate API, allowing the client electronic device 1300 to prevent playback of a blacked-out program.

It should be understood that the particular division of functionality between the various system components shown in FIG. 14 is purely exemplary and is not intended to be limiting. Functions performed by a single system component may instead be performed by multiple system components and functions performed by multiple system components may instead be performed by a single system component.

An embodiment may be an article of manufacture in which a non-transitory computer-readable medium (such as microelectronic memory) has stored thereon instructions (e.g., computer code) which program one or more data processing components (generically referred to here as a "processor") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While the several embodiments have described, those skilled in the art will recognize that the techniques described herein are not limited to the embodiments described, but can be practiced with modification and alteration within the spirit and scope of the appended claims. The description is thus to be regarded as illustrative instead of limiting.

What is claimed is:

1. A method performed by an electronic device to allow a user to navigate a video, wherein there are a plurality of thumbnails of the video, wherein each of the thumbnails is associated with a time position in the video, wherein there is a currently selected thumbnail of the plurality of thumbnails, the method comprising:
   causing a display of the currently selected thumbnail in a first rectangular area overlaying a bidirectionally scrollable strip of thumbnails in a second rectangular area having the plurality of thumbnails logically arranged in order from left to right according to their associated time positions, wherein the currently selected thumbnail in the first rectangular area is a more largely displayed version of the one of the plurality of thumbnails in the bidirectionally scrollable strip of thumbnails that is closest to a center of the first rectangular area, and wherein at least part of the currently selected thumbnail in the first rectangular area overlays the currently selected thumbnail in the bidirectionally scrollable strip of thumbnails; and
   responsive to data reflecting a swipe gesture in a direction from a user, causing an update to the display of the bidirectionally scrollable strip of thumbnails to reflect the bidirectionally scrollable strip of thumbnails inertially scrolling in the direction and behind the first rectangular area, wherein the direction is left or right, and wherein the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area and a preceding or following one of the thumbnails in the bidirectionally scrollable strip of thumbnails is selected as the currently selected thumbnail because it is now closest to the center of the first rectangular area.

2. The method of claim 1, wherein the currently selected thumbnail in the first rectangular area is greater than 1 and less than 2 times larger than the thumbnails in the bidirectionally scrollable strip of thumbnails in the second rectangular area.

3. The method of claim 1, wherein the first rectangular area is at a center of a display area.

4. The method of claim 3, wherein the first rectangular area has left and right edges that are equal distant from left and right edges of the display area, wherein a leftmost part and a rightmost part of the second rectangular area respectively extend from the left and right edges of the first rectangular area to the left and right edges of the display area, wherein the leftmost part and the rightmost part of the second rectangular area are each wider than one of the thumbnails in the bidirectionally scrollable strip of thumbnails in the second rectangular area.

5. The method of claim 4, wherein the leftmost part includes at least part of one of the thumbnails when the rightmost part includes none, wherein the rightmost part includes at least part of one of the thumbnails when the leftmost part includes none.

6. The method of claim 1, further comprising:
   responsive to data reflecting a tap gesture from the user, causing playback of the video starting at a time position associated with the currently selected thumbnail.

7. The method of claim 1, wherein the bidirectionally scrollable strip of thumbnails overlays the video while the video is paused.

8. The method of claim 1, wherein causing the display of the currently selected thumbnail in the first rectangular area is in response to data reflecting a swipe gesture from the user.

9. A device for allowing a user to navigate a video, wherein there are a plurality of thumbnails of the video, wherein each of the thumbnails is associated with a time position in the video, wherein there is a currently selected thumbnail of the plurality of thumbnails, the device comprising:
   one or more processors;
   a network interface to interface with a data network;
   a video interface to output the video to a display;
   an input/output (I/O) interface to receive user input; and
   a non-transitory computer-readable medium having stored therein instructions, which when executed by the one or more processors, causes the device to:
      cause a display of the currently selected thumbnail in a first rectangular area overlaying a bidirectionally scrollable strip of thumbnails in a second rectangular area having the plurality of thumbnails logically arranged in order from left to right according to their associated time positions, wherein the currently selected thumbnail in the first rectangular area is a more largely displayed version of the one of the plurality of thumbnails in the bidirectionally scrollable strip of thumbnails that is closest to a center of the first rectangular area, and wherein at least part of the currently selected thumbnail in the first rectangular area overlays the currently selected thumbnail in the bidirectionally scrollable strip of thumbnails and responsive to data reflecting a swipe gesture in a direction from a user, cause an update to the display of the bidirectionally scrollable strip of thumbnails to reflect the bidirectionally scrollable strip of thumbnails inertially scrolling in the direction and behind the first rectangular area, wherein the direction is left or right, and wherein the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area and a preceding or following one of the thumbnails in the bidirectionally scrollable strip of thumbnails is selected as the currently selected thumbnail because it is now closest to the center of the first rectangular area.

10. The device of claim 9, wherein the currently selected thumbnail in the first rectangular area is greater than 1 and less than 2 times larger than the thumbnails in the bidirectionally scrollable strip of thumbnails in the second rectangular area.

11. The device of claim 9, wherein the first rectangular area is at a center of a display area.

12. The device of claim 11, wherein the first rectangular area has left and right edges that are equal distant from left and right edges of the display area, wherein a leftmost part and a rightmost part of the second rectangular area respectively extend from the left and right edges of the first rectangular area to the left and right edges of the display area, wherein the leftmost part and the rightmost part of the second rectangular area are each wider than one of the thumbnails in the bidirectionally scrollable strip of thumbnails in the second rectangular area.

13. The device of claim 12, wherein the leftmost part includes at least part of one of the thumbnails when the rightmost part includes none, wherein the rightmost part includes at least part of one of the thumbnails when the leftmost part includes none.

14. The device of claim 9, wherein the instructions, when executed by the one or more processors of the device, further causes the device to:
responsive to data reflecting a tap gesture from the user, cause playback of the video starting at a time position associated with the currently selected thumbnail.

15. A non-transitory computer-readable medium having stored therein instructions, which when executed by one or more processors of an electronic device, causes the electronic device to perform operations for allowing a user to navigate a video, wherein there are a plurality of thumbnails of the video, wherein each of the thumbnails is associated with a time position in the video, wherein there is a currently selected thumbnail of the plurality of thumbnails, the operations comprising:
causing a display of the currently selected thumbnail in a first rectangular area overlaying a bidirectionally scrollable strip of thumbnails in a second rectangular area having the plurality of thumbnails logically arranged in order from left to right according to their associated time positions, wherein the currently selected thumbnail in the first rectangular area is a more largely displayed version of the one of the plurality of thumbnails in the bidirectionally scrollable strip of thumbnails that is closest to a center of the first rectangular area, and wherein at least part of the currently selected thumbnail in the first rectangular area overlays the currently selected thumbnail in the bidirectionally scrollable strip of thumbnails; and
responsive to a user input indicating a direction, causing an update to the display of the bidirectionally scrollable strip of thumbnails to reflect the bidirectionally scrollable strip of thumbnails inertially scrolling in the direction and behind the first rectangular area, wherein the direction is left or right, and wherein the currently selected thumbnail in the first rectangular area is updated each time the bidirectionally scrollable strip of thumbnails has scrolled past a threshold such that the currently selected thumbnail in the bidirectionally scrollable strip of thumbnails is no longer closest to the center of the first rectangular area and a preceding or following one of the thumbnails in the bidirectionally scrollable strip of thumbnails is selected as the currently selected thumbnail because it is now closest to the center of the first rectangular area.

16. The non-transitory computer-readable medium of claim 15, wherein the user input is a keyboard input.

17. The non-transitory computer-readable medium of claim 15, wherein the first rectangular area is at a center of a display area.

18. The non-transitory computer-readable medium of claim 17, wherein the first rectangular area has left and right edges that are equal distant from left and right edges of the display area, wherein a leftmost part and a rightmost part of the second rectangular area respectively extend from the left and right edges of the first rectangular area to the left and right edges of the display area, wherein the leftmost part and the rightmost part of the second rectangular area are each wider than one of the thumbnails in the bidirectionally scrollable strip of thumbnails in the second rectangular area.

19. The non-transitory computer-readable medium of claim 18, wherein the leftmost part includes at least part of one of the thumbnails when the rightmost part includes none, wherein the rightmost part includes at least part of one of the thumbnails when the leftmost part includes none.

20. The non-transitory computer-readable medium of claim 15, wherein the instructions, when executed by the one or more processors of the electronic device, cause the electronic device to perform further operations comprising:
responsive to a user input indicating a selection, causing playback of the video starting at a time position associated with the currently selected thumbnail.

* * * * *